United States Patent
Yoon et al.

(10) Patent No.: US 10,073,214 B2
(45) Date of Patent: Sep. 11, 2018

(54) DISPLAY MODULE AND DISPLAY APPARATUS HAVING THE SAME

(71) Applicant: SAMSUNG ELECTRONICS CO., LTD., Suwon-si (KR)

(72) Inventors: Min Gyu Yoon, Suwon-si (KR); Sung Yong Park, Suwon-si (KR); Heong Seog Lee, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 173 days.

(21) Appl. No.: 14/988,117

(22) Filed: Jan. 5, 2016

(65) Prior Publication Data

US 2016/0195673 A1 Jul. 7, 2016

(30) Foreign Application Priority Data

Jan. 5, 2015 (KR) .................. 10-2015-0000920
Feb. 3, 2015 (KR) .................. 10-2015-0017023

(51) Int. Cl.
*F21V 7/04* (2006.01)
*F21V 8/00* (2006.01)

(52) U.S. Cl.
CPC ............ *G02B 6/0088* (2013.01); *G02B 6/005* (2013.01)

(58) Field of Classification Search
CPC .... G02B 6/0088; G02B 6/0086; G02B 6/005; G02B 6/0023
See application file for complete search history.

(56) References Cited

U.S. PATENT DOCUMENTS

| 2002/0140880 A1* | 10/2002 | Weindorf ............. G02B 6/0023 349/70 |
| 2008/0111946 A1* | 5/2008 | Lee .................... G02F 1/133604 349/62 |
| 2008/0266483 A1 | 10/2008 | Kim |
| 2011/0193105 A1* | 8/2011 | Lerman ............... H01L 25/0753 257/88 |
| 2014/0009914 A1 | 1/2014 | Cho et al. |

(Continued)

FOREIGN PATENT DOCUMENTS

| KR | 10-2013-0001083 A | 1/2013 |
| KR | 10-2013-0123718 A | 11/2013 |

OTHER PUBLICATIONS

International Search Report (PCT/ISA/210) dated May 25, 2016 issued by the International Searching Authority in counterpart International Application No. PCT/KR2015/014334.

(Continued)

*Primary Examiner* — Elmito Breval
*Assistant Examiner* — Omar Rojas Cadima
(74) *Attorney, Agent, or Firm* — Sughrue Mion, PLLC

(57) ABSTRACT

A display module and a display apparatus having the display module are provided. The display module includes a light guide plate which turns a path of generated light and emits the light through an emitting surface, a quantum dot (QD) sheet provided to correspond to the emitting surface to improve color reproducibility of the light emitted from the light guide plate, and at least one guide member which is fixed inside of a chassis and supports the light guide plate and the QD sheet. Using such a configuration, the color reproducibility of the display module may be improved, and the light guide plate and the QD sheet may be fixed together.

31 Claims, 26 Drawing Sheets

(56) References Cited

U.S. PATENT DOCUMENTS

| | | | |
|---|---|---|---|
| 2014/0111736 A1 | 4/2014 | An et al. | |
| 2014/0119049 A1 | 5/2014 | Kim et al. | |
| 2014/0226072 A1 | 8/2014 | Ikuta | |
| 2014/0240644 A1 | 8/2014 | Abe | |
| 2015/0009453 A1* | 1/2015 | Cha | G02B 6/0001 |
| | | | 349/65 |
| 2016/0091657 A1* | 3/2016 | Yang | G02F 1/133615 |
| | | | 362/608 |

OTHER PUBLICATIONS

Communication dated May 24, 2016, issued by the European Patent Office in counterpart European Application No. 16150275.2.
Communication dated May 8, 2018, issued by the European Patent Office in counterpart European Application No. 16150275.2.

* cited by examiner

DISPLAY MODULE AND DISPLAY APPARATUS HAVING THE SAME

CROSS-REFERENCE TO RELATED APPLICATIONS

This application claims priority from Korean Patent Application No. 10-2015-0000920, filed on Jan. 5, 2015, and Korean Patent Application No. 10-2015-0017023, filed on Feb. 3, 2015, in the Korean Intellectual Property Office, the disclosures of which are incorporated herein by reference in their entirety.

BACKGROUND

1. Field

Apparatuses consistent with exemplary embodiments relate to a display apparatus, and more particularly, to a display module in which color reproducibility is improved and a display apparatus having the same.

2. Description of the Related Art

In general, a display apparatus is an apparatus which displays a screen and includes a monitor or a television set. The display apparatus uses a self-luminous display panel such as an organic light emitting diode (OLED) panel, or a light-receiving display panel such as a liquid crystal display (LCD) panel.

The display apparatus to which the light-receiving display panel is applied includes a display panel formed with an LCD and in which a screen is displayed, and a backlight unit which supplies light to the display panel. The backlight unit includes a light source, and a plurality of optical sheets which receive the light from the light source and guide the light to the display panel. Here, the optical sheets may include a reflecting sheet, a light guide plate or a diffusive sheet and a prism sheet, a polarizing sheet, etc.

Therefore, there is a need to improve the structure and shape of the display apparatus to achieve a slim or thin design thereof while maintaining or improving the functionality and rigidity of the display apparatus.

SUMMARY

One or more exemplary embodiments provide a display module in which color reproducibility is improved in an LCD apparatus which displays images using light incident from a backlight unit.

One or more exemplary embodiments also provide optimum layout design between a quantum dot (QD) sheet which improves color reproducibility and a plurality of optical sheets, in an LCD apparatus.

One or more exemplary embodiments also provide a display module having a structure which easily fixes a QD sheet which can be applied to improve color reproducibility to a backlight unit, and a display apparatus having the same.

One or more exemplary embodiments also provide a display module implemented using a narrow bezel when a QD sheet is applied thereto, and a display apparatus having the same.

According to an aspect of an exemplary embodiment, there is provided a display module including: a display panel; a chassis which supports the display panel; a light source which is provided at at least one side surface inside the chassis and is configured to emit light; a light guide plate which has a emitting surface and is configured to guide the light emitted by the light source through the emitting surface; a quantum dot (QD) sheet which is provided between the emitting surface of the light guide plate and the display panel; and at least one guide member which is fixed to an interior surface of the chassis, and aligns the light guide plate and the QD sheet.

The at least one guide member may support the light guide plate and the QD sheet together.

The at least one guide member may be detachably fixed to the chassis.

The at least one guide member may include: a first guide portion which supports a side surface of the light guide plate; and a second guide portion which extends from the first guide portion and supports a side surface of the QD sheet.

The second guide portion may protrude from the first guide portion.

The first guide portion may include: a first position guide portion which guides the light guide plate to an installation position thereof; and a first seating portion which seats the light guide plate guided by the first position guide portion.

The second guide portion may include: a second position guide portion which guides the QD sheet to an installation position thereof; and a second seating portion which seats the QD sheet guided by the second position guide portion.

The first seating portion may be provided on a surface of the first position guide portion and the second seating portion may be provided on a surface of the second position guide portion.

The second position guide portion may be stepped with respect to the first position guide portion.

The light guide plate may be supported by the first guide portion, and the first guide portion may extend to a front surface of the light guide plate.

The chassis may include a bottom chassis provided at a rear of the light guide plate, the rear of the light guide plate being opposite the emitting surface of the light guide plate, and the at least one guide member may include a member fixing portion which fixes the guide member to the bottom chassis, and extends from the first guide portion, and is interposed between the bottom chassis and the rear of the light guide plate.

The at least one guide member may further include a position determination portion which extends from the first guide portion into the bottom chassis, and is configured to fix a position of the guide member with respect to the bottom chassis.

The light guide plate may include a light guide plate body; a light guide plate seating portion which protrudes from the light guide plate body; and a light guide plate groove portion which is formed in the light guide plate seating portion and receives the first guide portion, and the QD sheet may include a QD sheet body; a QD sheet seating portion which protrudes from the QD sheet body; and a QD sheet groove portion formed in the QD sheet seating portion and receives the second guide portion.

The light source may include: a plurality of blue light emitting diodes (LEDs) configured to emit blue light; and a circuit board configured to supply power to the plurality of blue LEDs, and the QD sheet may include a yellow QD sheet configured to convert the blue light emitted by the plurality of blue LEDs into white light.

The at least one guide member may include a first guide member which supports an upper portion of the light guide plate and the QD sheet at a first position, and a second guide member which supports the upper portion of the light guide plate and the QD sheet at a second position.

The at least one guide member may further include a third guide member which supports a lower portion of the light guide plate and the QD sheet.

The chassis may include a bottom chassis provided at a rear surface of the light guide plate, and the display module further comprises a middle mold having a pressing rib which is coupled to the bottom chassis and presses the light guide plate and the QD sheet together.

The at least one guide member may be black so as to reduce a reflection of light emitted by the light source.

The QD sheet may be in contact with the emitting surface of the light guide plate.

The display module may further include a middle mold having a pressing rib which is coupled to the chassis and presses the light guide plate and the QD sheet together.

The display module may further include an optical sheet which is interposed between the QD sheet and the display panel, and the middle mold may include: a middle body coupled to the chassis; and a pressing rib which extends from the middle body and presses the optical sheet and the light guide plate against the QD sheet.

According to an aspect of another exemplary embodiment there is provided display apparatus including: a housing; and a display module supported by the housing and configured to display an image, wherein the display module includes: a display panel; a backlight unit which is configured to emit light to the display panel, the backlight unit including a light source including a plurality of blue LEDs which emit blue light; a light guide plate which has an emitting surface and is configured to guide the light emitted by the light source through the emitting surface toward the display panel; a quantum dot (QD) sheet is provided between the emitting surface of the light guide plate and the display panel, and is configured to convert the blue light emitted by the plurality of blue LEDs into white light; and a chassis which accommodates the light source, the light guide plate, and the QD sheet.

The display apparatus may further include a middle mold having a pressing rib which is coupled to the chassis and presses the light guide plate and the QD sheet together.

The display module may further include an optical sheet provided between the QD sheet and the display panel, and the middle mold may include: a middle body coupled to the chassis; and a pressing rib which extends from the middle body and presses the QD sheet, the optical sheet and the light guide plate.

The pressing rib may extend along an entire circumference of the QD sheet and the optical sheet.

BRIEF DESCRIPTION OF THE DRAWINGS

The above and/or other aspects will become apparent and more readily appreciated from the following description of exemplary embodiments, taken in conjunction with the accompanying drawings of which.

DETAILED DESCRIPTION

Figure 1:
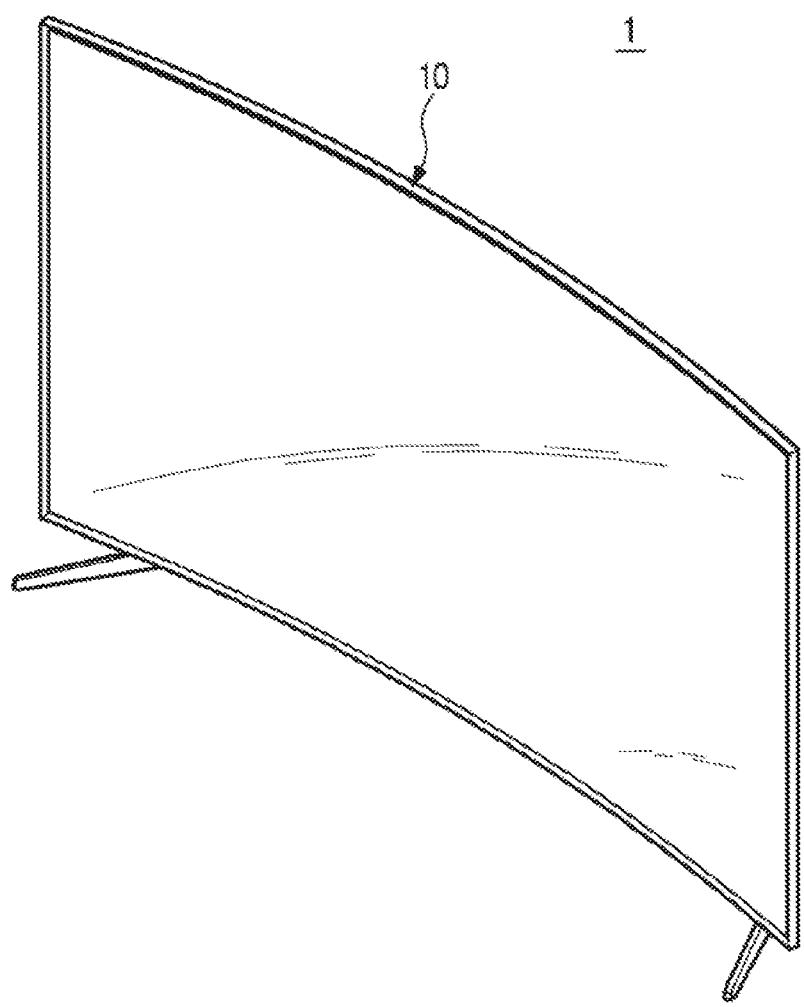
FIG. 1 is a perspective view illustrating a display apparatus according to an exemplary embodiment.

Reference will now be made in detail to the exemplary embodiments, examples of which are illustrated in the accompanying drawings, wherein like reference numerals refer to like elements throughout.

Hereinafter, exemplary embodiments will be described in detail with reference to following drawings.

Even though exemplary embodiments are illustrated based on a curved display apparatus, exemplary embodiments may also be applied to a flat display apparatus.

In addition, a display apparatus according to an exemplary embodiment may be an apparatus such as a television set, a monitor, an electronic whiteboard, an electronic signage, or a tablet to which a light-receiving display panel is applied.

Figure 2A:
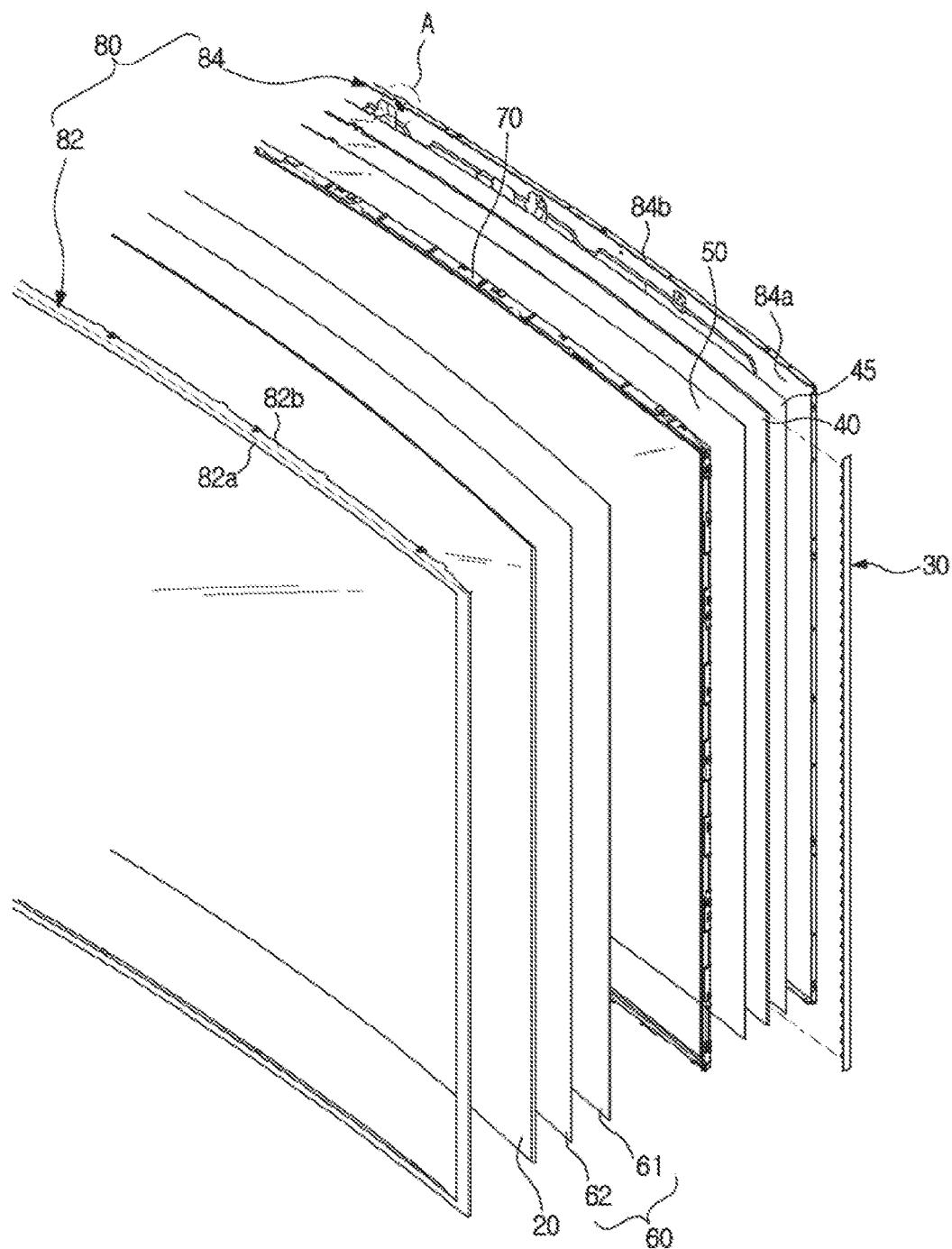
FIGS. 2A and 2B are exploded perspective views illustrating a display module and the display apparatus according to an exemplary embodiment.
Figure 2B:
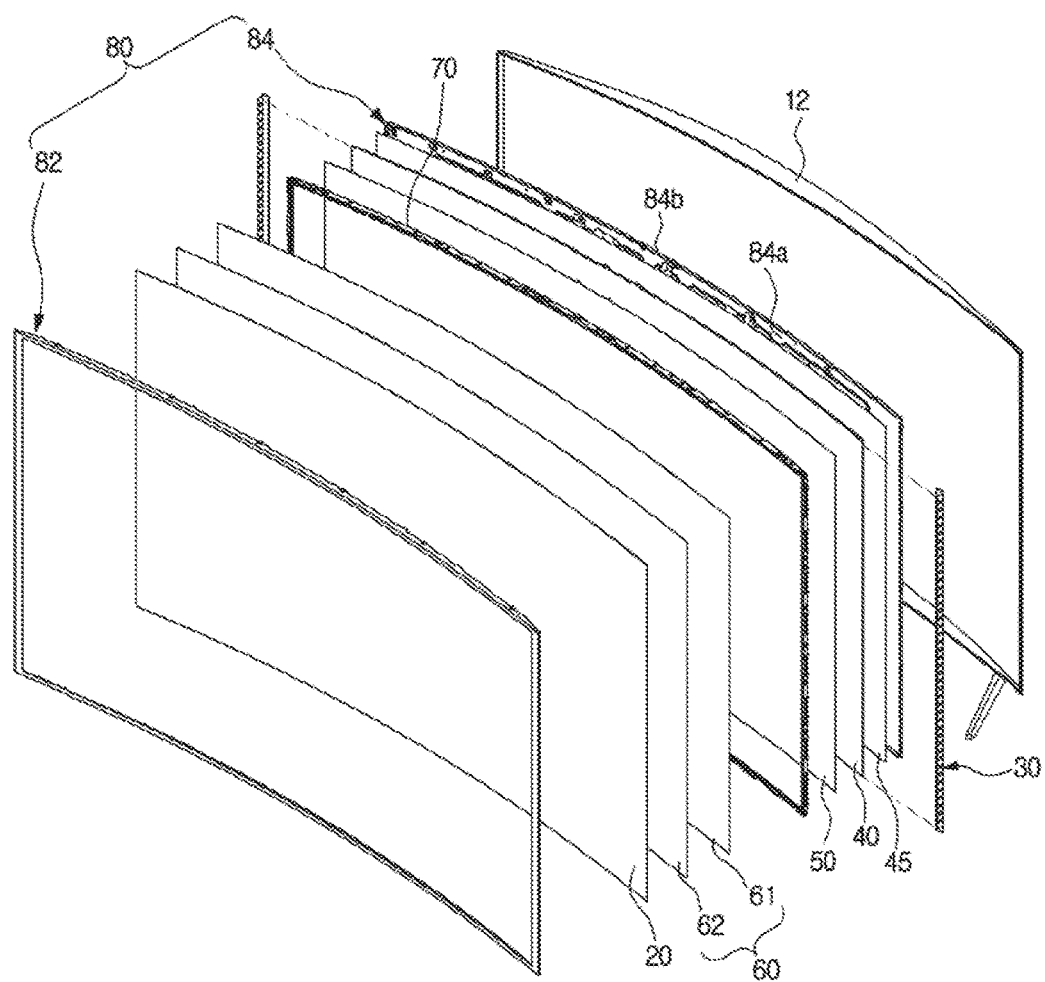
Figure 2C:
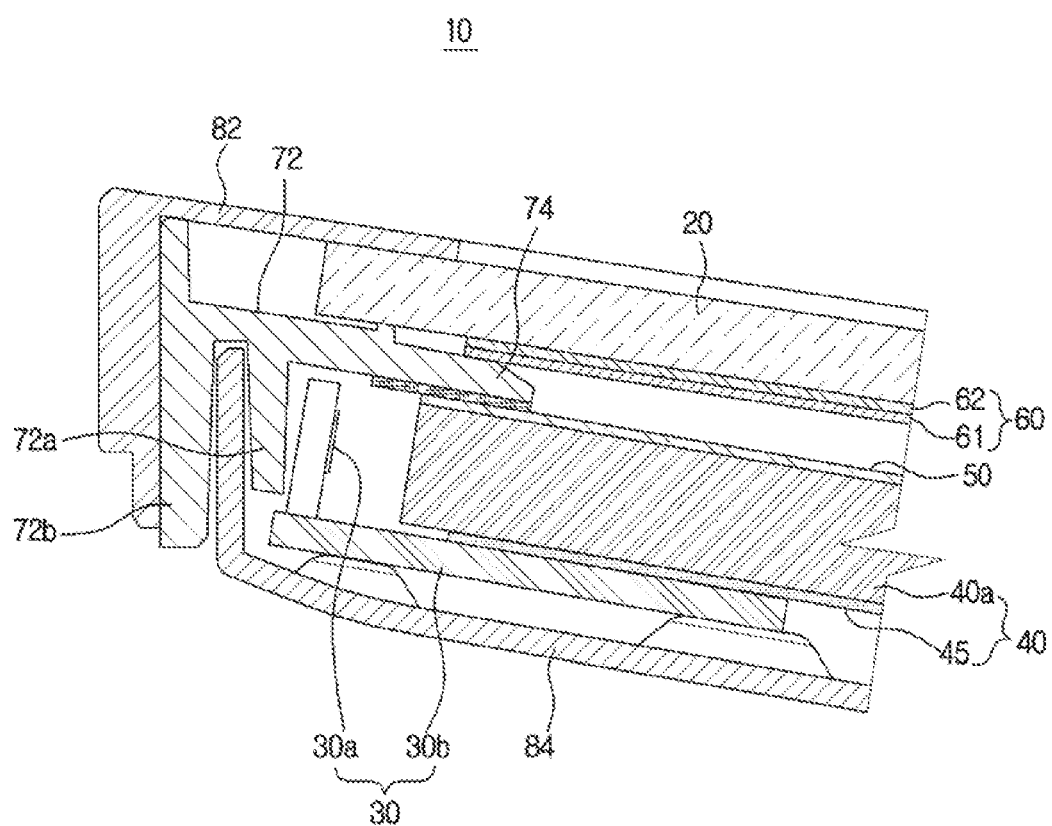
FIG. 2C is a lengthwise cross-sectional view illustrating a part of the display module according to an exemplary embodiment.

FIG. 1 is a perspective view illustrating a display apparatus according to an exemplary embodiment, FIGS. 2A and 2B are exploded perspective views illustrating a display module and the display apparatus according to an exemplary embodiment, and FIG. 2C is a lengthwise cross-sectional view illustrating a part of the display module according to an exemplary embodiment.

As illustrated in FIG. 1, as a display apparatus 1 according to an exemplary embodiment is formed to have a curvature and a curved shape in which both side ends thereof protrude in a forward direction compared to a central portion thereof. The curved display apparatus may be implemented with a display panel itself which has the curvature, or with a display panel which is flat and a chassis 80 which has a curvature and supports the flat display panel. Thus, the curved display apparatus may improve degree of immersion when images are displayed.

Even though exemplary embodiments are described using the curved display apparatus 1, for example, the exemplary embodiments may also be applied to a flat display apparatus, or to a flexible display apparatus in which a curved state or a flat state are interchangeable.

In addition, the exemplary embodiments may also be applied to all display apparatuses 1 to which a light guide plate 40 and a quantum dot (QD) sheet 50 are applied, regardless of a size of a screen. For example, the exemplary embodiments may be applied to products such as a smart television set, a monitor which may be installed on a table, a wall, and a ceiling, or also to portable devices such as a tablet, a notebook, a smart phone, and an e-book.

Such a display apparatus 1 includes a display module 10 which includes the QD sheet 50 and displays images, at least one circuit board which is electrically connected to the display module 10, and a housing 12 which supports the display module 10.

The at least one circuit board may include a power supply board in which circuit components configured to supply power to the display module are provided, a signal processing board in which circuit components configured to connect to external devices or to receive and process external signals are provided, and a driving board for driving the display module, and the boards may be independently provided, or be merged and provided.

The display module 10 may include a display panel 20 which displays images, a backlight unit, and a chassis. The backlight unit may include optical members such as a light source, a light guide plate, a sheet member, etc.

That is, according to an exemplary embodiment, the display module which is an edge type backlight unit may include a light source 30 provided at a rear of the display panel 20, and the light guide plate 40 provided to guide light emitted by the light source 30 to the display panel 20. The light guide plate (LGP) may serve to convert the light emitted by the light source 30 into a surface light source, and to emit the light toward the display panel 20.

The backlight unit may further include a sheet member. The sheet member may include an optical sheet 60 having an optical characteristic, and the QD sheet 50 provided to improve color reproducibility.

The chassis 80 may include a top chassis 82, and a bottom chassis 84 provided at a rear of the top chassis 82. The top chassis 82 and the bottom chassis 84 may also be coupled by insertion coupling or screw coupling. The chassis 80 may be provided to support the display panel 20.

In an exemplary embodiment, since the curved display apparatus 1 is formed in a curved shape, the display module 10 embedded in the curved display apparatus 1 is also formed to have a lengthwise curvature. Accordingly, the display panel 20, the light guide plate 40, a middle mold 70, the top chassis 82, and the bottom chassis 84 which form the display module 10 are formed to have the lengthwise curvature, and to have a shape in which both side ends thereof protrude in a forward direction compared to a central portion thereof. Here, the components may have the same curvature, but the components may also be designed to have different curvatures according to design.

For example, at least one of the display panel 20, the light guide plate 40, and the sheet member may be formed in a flat shape, and a curvature may also be maintained by the chassis 82 and 84.

The light source 30 may be provided at at least a part of a circumference of the light guide plate 40, and may emit light. The light source 30 may be provided along a short side of the light guide plate 40, or may also be provided along a long side thereof. A position of the light source 30 is not limited as long as the light source 30 is provided along at least a part of the circumference of the light guide plate 40, and is provided to emit light to the light guide plate 40. In addition, the light source 30 may be provided at at least one side in the chassis 80. For example, the light source 30 may be provided at one side of the display module 10 as illustrated in FIG. 2A, or a pair of light sources 30 may also be provided at both sides of the display module 10 as illustrated in FIG. 2B.

The display module 10 may include the middle mold 70. The middle mold 70 and the chassis may be provided so that at least parts of components inside the chassis are seated.

The display panel 20 and the top chassis 82 may be provided in front of the middle mold 70, and the bottom chassis 84 may be provided at a rear thereof and may support components. In addition, the middle mold 70 may maintain a state in which the display panel 20 and the bottom chassis 84 are spaced apart from each other, and may minimize thermal conduction that heat generated by the light source and the like is conducted to the display panel through the bottom chassis.

The top chassis 82 includes a bezel portion 82a which covers a front edge of the display panel 20, and a top side surface portion 82b which is bent from an end of the bezel portion 82a in a backward direction, and covers a side surface of the middle mold 70.

The bottom chassis 84 includes a rear surface portion 84a which forms a rear surface of the display module 10, and a bottom side surface portion 84b which extends from a circumference of the rear surface portion 84a in a forward direction, and is coupled to an inside of the middle mold 70.

Since the bottom chassis 84 is formed to have both side ends which protrude compared to a central portion thereof in a curved shape, the rear surface portion 84a of the bottom chassis 84 is also formed to have both side ends which protrude in a forward direction compared to a central portion thereof in a curved shape.

Accordingly, light generated by an emitting diode is reflected by a reflective portion 45 provided at the rear surface portion 84a of the bottom chassis 84 formed in a curved surface, and is guided to the display panel 20. That is, the reflective portion 45 serves to guide the light emitted by the emitting diode to the display panel 20.

Figure 3:
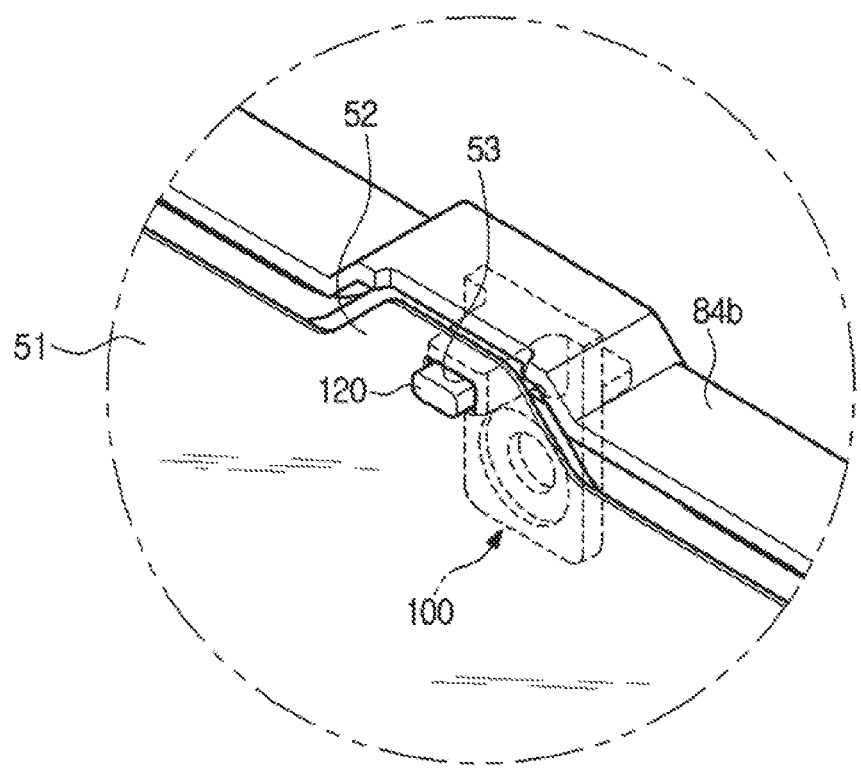
FIG. 3 is an enlarged view illustrating a part of the display apparatus according to an exemplary embodiment.
Figure 4:
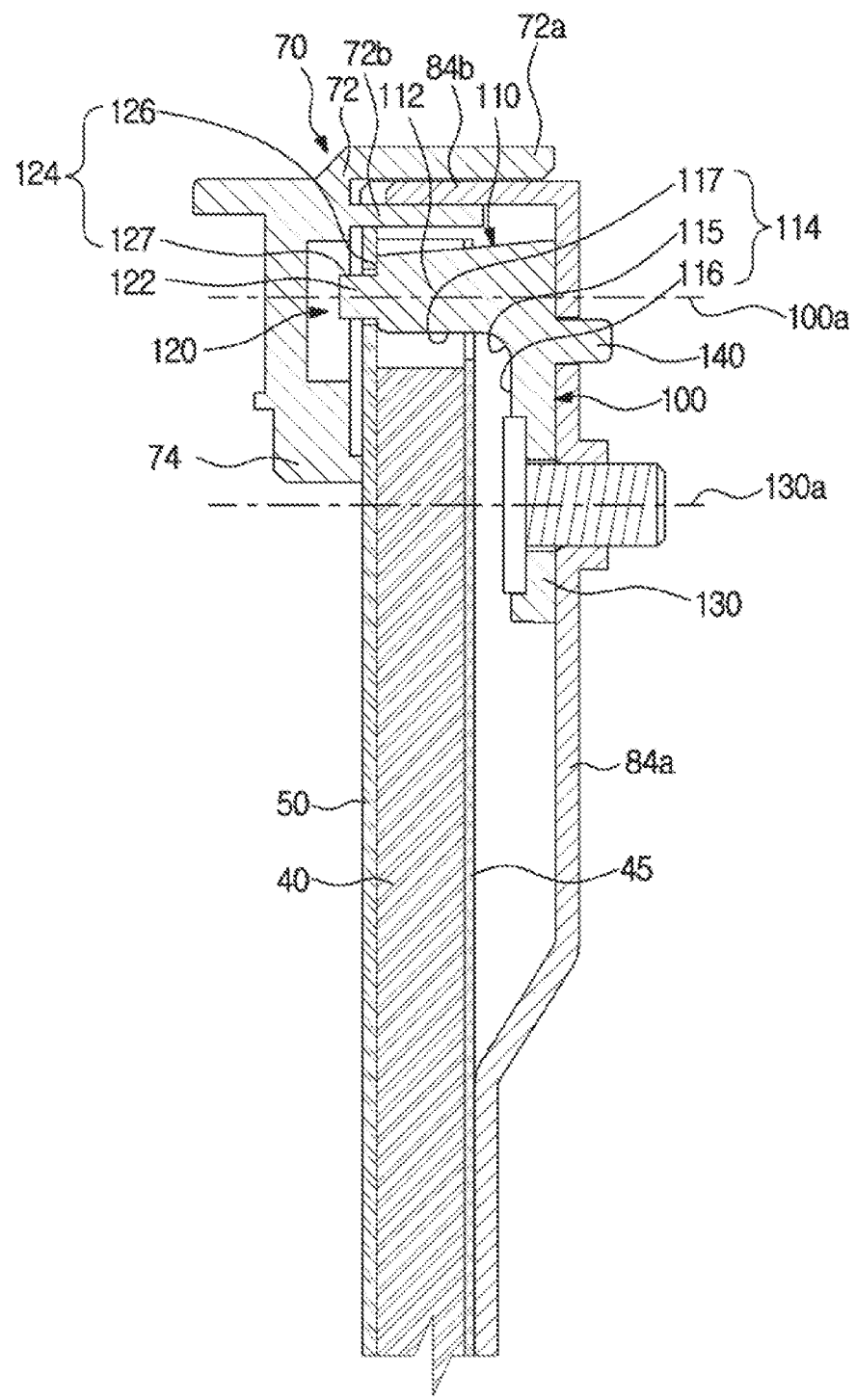
FIG. 4 is a cross-sectional view illustrating a guide member and a configuration adjacent thereto of the display apparatus according to an exemplary embodiment.
Figure 5:
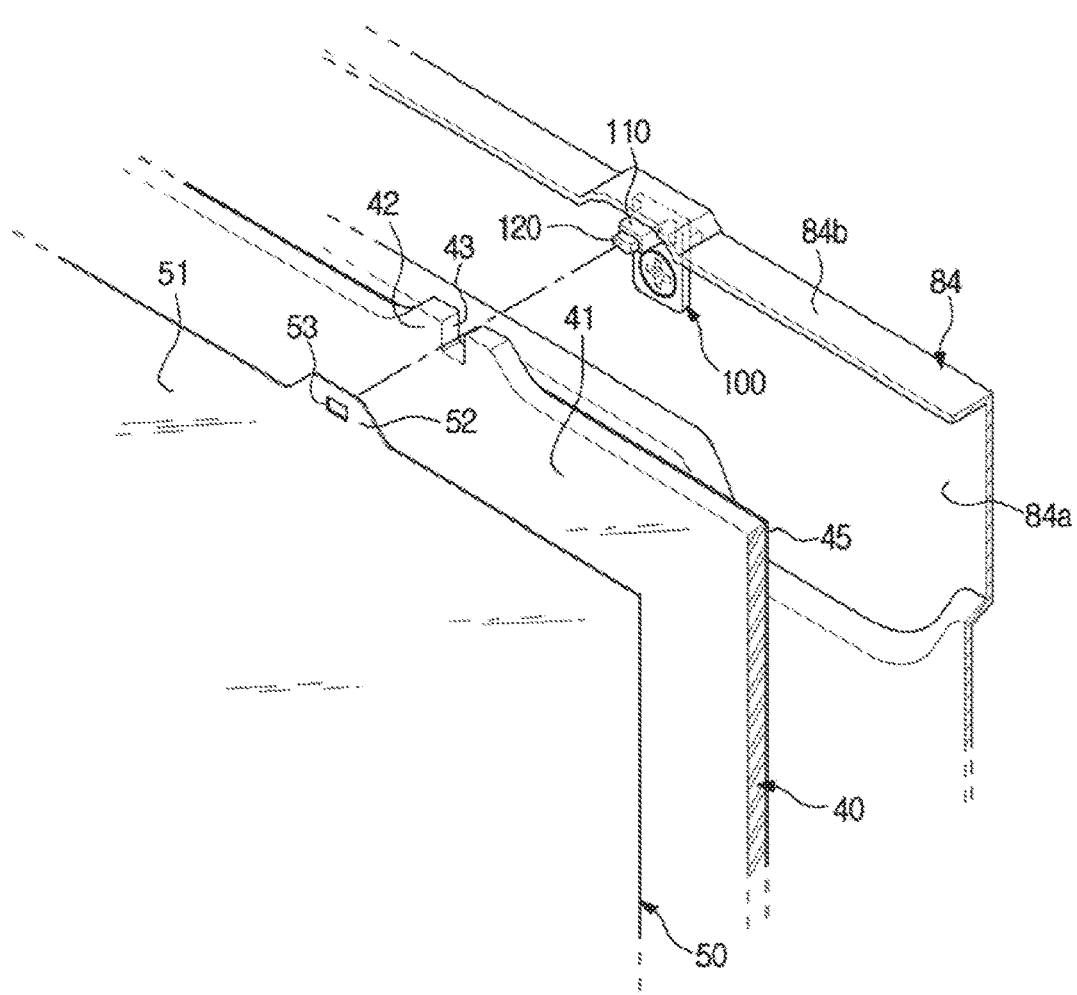
FIG. 5 is an exploded perspective view illustrating the guide member, a light guide plate, and a quantum dot (QD) sheet according to an exemplary embodiment.
Figure 6:
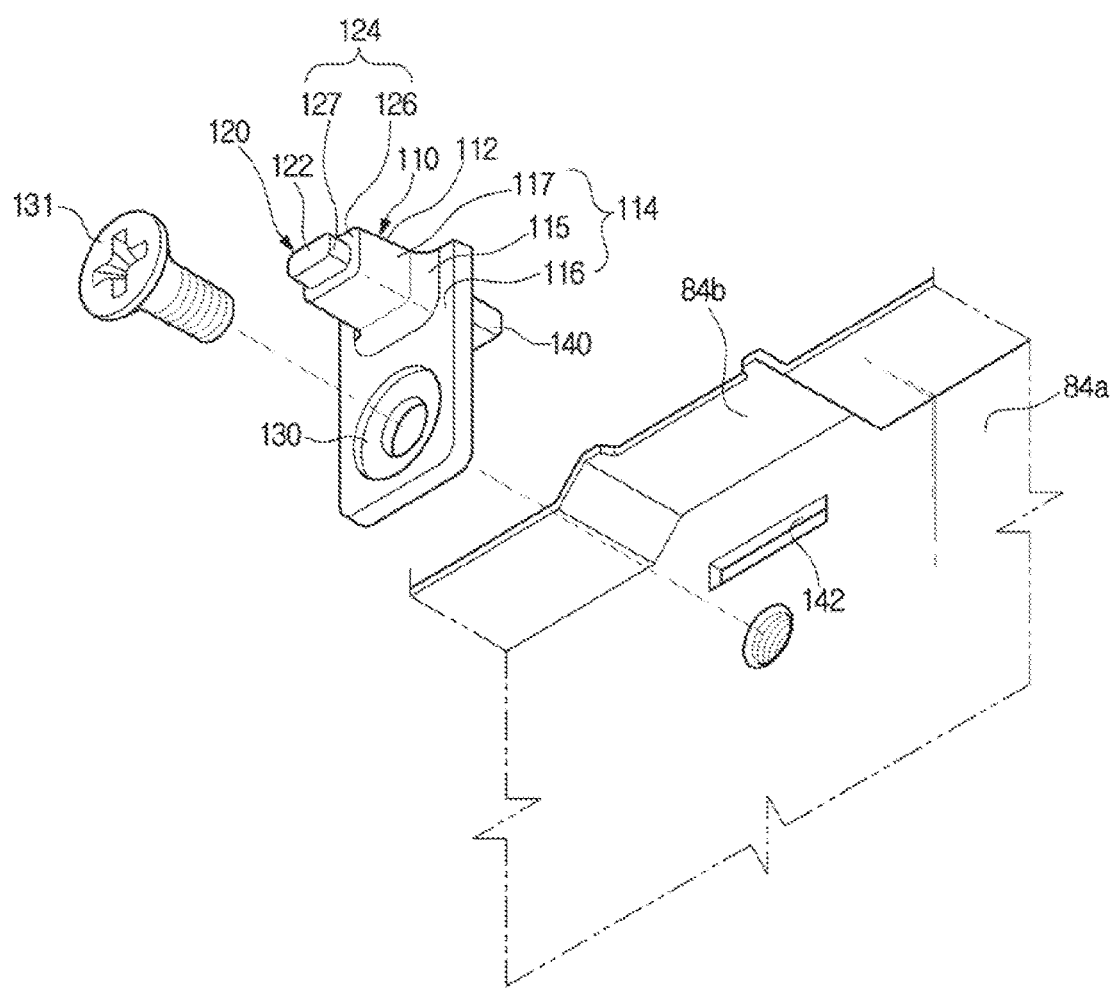
FIG. 6 is a perspective view illustrating the guide member according to an exemplary embodiment.
Figure 7:
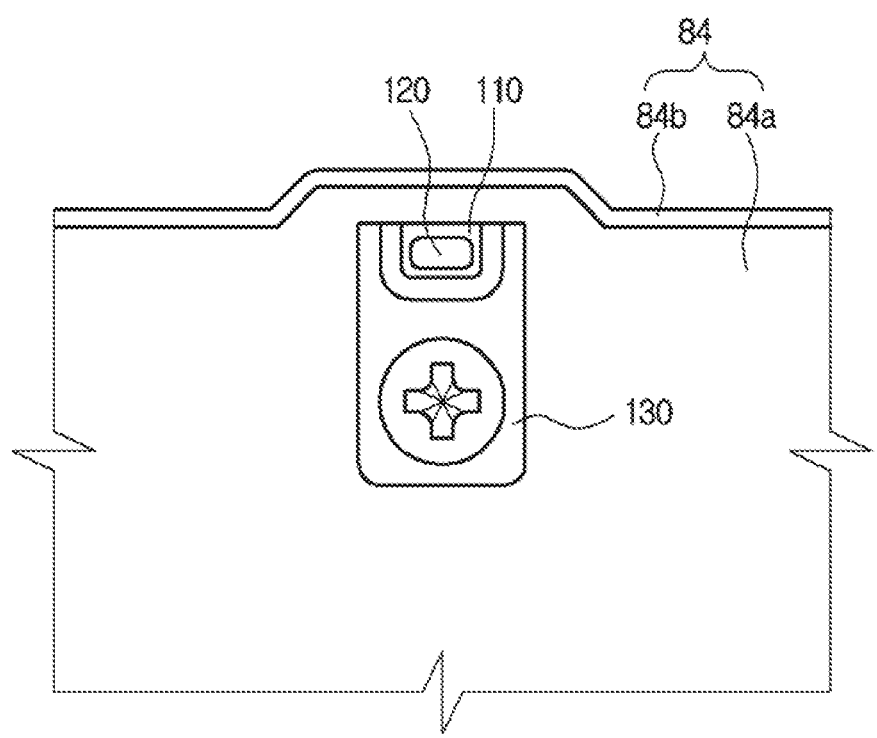
FIG. 7 is a front view illustrating the guide member according to an exemplary embodiment.

FIG. 3 is an enlarged view illustrating a part of the display apparatus according to an exemplary embodiment, FIG. 4 is a cross-sectional view illustrating a guide member and a configuration adjacent thereto of the display apparatus according to an exemplary embodiment, FIG. 5 is an exploded perspective view illustrating the guide member, a light guide plate, and a quantum dot (QD) sheet according to an exemplary embodiment, FIG. 6 is a perspective view illustrating the guide member according to an exemplary embodiment, and FIG. 7 is a front view illustrating the guide member according to an exemplary embodiment.

The light source 30 includes light emitting diodes (LEDs) 30a. A plurality of LEDs may be provided at equidistant intervals and may be provided to form one module. Each of the modules may be provided at an edge portion of the light guide plate 40. The LED includes a blue LED. The light source 30 may further include a circuit board 30b, and the circuit board 30b may be provided to send an electrical signal to the LED 30a and to turn on/off the LED 30a. As an exemplary embodiment, the LED 30a is provided in a line on the circuit board 30b and operates. The light source 30 is provided at both sides of a space between the light guide plate 40 and an inner surface of the bottom chassis 84, that is, a side of the side surface portion 84b of the bottom chassis 84. Accordingly, light generated by the light source 30 is emitted through a space between the rear surface portion of the bottom chassis 84 and the light guide plate 40 to the rear surface portion of the bottom chassis 84.

The light guide plate 40 may include the reflective portion 45 at a rear surface thereof. Specifically, the light guide plate 40 may include a light guide portion 40a and the reflective portion 45. The reflective portion 45 may be provided at the rear surface of the light guide plate 40 so that light generated by the light source faces in a forward direction. Specifically, the reflective portion 45 may be provided so that the light generated by the light source is reflected toward the display panel 20.

The reflective portion 45 may be provided in a shape of a reflecting plate, or may also be provided in a shape of reflecting sheet. In addition, the reflective portion 45 may be separately provided to the light guide plate 40 and provided at the rear surface of the light guide plate 40, or may also be integrally formed with the light guide plate 40. In addition, as the rear surface of the light guide plate 40 is reflectively coated, an effect which is the same effect as described above may be obtained.

The light guide plate 40 is provided to transmit light generated by the light source therethrough. To this end, the light guide plate 40 may be formed of a transparent resin. The light guide plate 40 may be separately provided from the light source at a predetermined interval to minimize deformation due to heat generated by the light source.

The display apparatus 1 may include sheet members.

The sheet members may include the optical sheet 60 having an optical characteristic, and the QD sheet 50 provided to improve color reproducibility.

The optical sheet 60 may include a diffuser sheet 61 which diffuses incident light, and a dual brightness enhancement film (DBEF) sheet 62 which is a high brightness prism sheet. The optical sheet 60 may include a polarizing sheet and a prism sheet.

The optical sheet 60 is interposed between the light guide plate 40 and the display panel, and changes an optical characteristic of light emitted by the light guide plate 40.

The QD sheet 50 is provided for color reproducibility. Color rendering index is a criterion for how close a color is to a natural color, and for how large of an area can be marked on a color coordinate. Since the QD sheet 50 has a higher color purity of white light compared to conventional technology, which converts white light emitted by an LED using a color filter, the efficiency of the light that passes the color filter becomes high, and the power efficiency of the overall display increases. The QD sheet 50 may also be referred to as a quantum dot sheet.

A QD will now be described. Generally, when electrons absorb energy, the electrons which are present in a valence band jump to a conduction band. After that, the electrons lose the energy and return to the valence band, and at this time, the absorbed energy is radiated as light. The QD generates an intensive fluorescence at a narrow wave band. All kinds of colors of visible light may be generated according to a size of the QD. In addition, since the QD itself generates natural color, there is no color loss, and thus the QD is also a material of high color reproducibility. When a particle of the QD is smaller, light having a shorter wavelength is generated, and when the particle is larger, light having a longer wavelength is generated. The QD may be a compound such as cadmium selenide (CdSe), cadmium sulfide (CdS), cadmium telluride (CdTe), zinc selenide (ZnSe), zinc telluride (ZnTe), zinc sulfide (ZnS), etc.

The QD sheet 50 may be provided so that light which passes the light guide plate 40 is emitted through the QD sheet 50. The QD sheet 50 may be adhered to the light guide plate 40 at a front surface of the light guide plate 40. The QD sheet 50 is adhered to the front surface of the light guide plate 40 so that the light emitted from the light guide plate 40 passes therethrough.

Since the light of an LED reaches the QD sheet 50 through the light guide plate 40, the QD sheet 50 is less influenced by heat of the LED, and thus, it is more reliable.

The QD sheet 50 may include a yellow QD sheet 50 corresponding to a blue LED. Blue light emitted by the blue LED is converted into white light when passed through the yellow QD sheet 50.

As described above, the light guide plate 40 according to an exemplary embodiment may include the light guide portion 40a and the reflective portion 45. Here, the reflective portion 45 may also be formed in a separate sheet.

The light guide portion 40a may include a light guide plate body 41, and a light guide plate groove portion 43 which is formed at the light guide plate body 41 in a groove shape to be supported by a first guide portion 110 in the groove shape. The light guide plate body 41 may include a light guide plate seating portion 42 which is formed to protrude from the same surface of the light guide plate body 41. The light guide plate groove portion 43 may be formed at the light guide plate seating portion 42.

The display apparatus 1 may include guide members 100.

The guide member 100 is provided to align the light guide plate 40 and the QD sheet 50 at an installation position inside the chassis 80. In order to emit white light through the QD sheet 50, light emitted from the light guide plate 40 passes through the QD sheet 50. To this end, the guide member 100 is provided to simultaneously guide and align the light guide plate 40 and the QD sheet 50, and to stably maintain adhesion therebetween.

The guide member 100 may be fixed inside the chassis 80. Specifically, the guide member 100 may be fixed to the bottom chassis 84. At least one guide member 100 is provided to guide or seat components inside the chassis 80.

A shape of the guide member 100 is not limited, but may have a cross-section perpendicular to a widthwise direction in a rectangular shape to prevent positions of the light guide plate 40 and the QD sheet 50 from being mismatched. In addition, the light guide plate groove portion 43 of the light guide plate 40 and a QD sheet groove portion 53 formed at an edge of the QD sheet 50 may also be provided to correspond to the guide member 100. The cross-section perpendicular to a widthwise direction of the guide member 100 is not limited to the rectangular shape, and may be provided by rounding a vertex of the rectangular shape, and may also be formed in a polygonal shape. In addition, the cross-section perpendicular to the widthwise direction of the guide member 100 may also be provided in a circular or an oval shape.

The guide member 100 may include guide portions configured to correctly position the components inside the chassis 80. The guide portions 110 and 120 may guide or seat the components inside the chassis 80.

The guide portion may include the first guide portion 110 and a second guide portion 120.

As an exemplary embodiment, a configuration in which the first guide portion 110 and the second guide portion 120 are integrally formed is described, but the first guide portion 110 and the second guide portion 120 may also be separately formed, and may also guide the light guide plate and the QD sheet from different positions thereof.

The first guide portion 110 is coupled to the light guide plate groove portion 43 of the light guide plate 40 and to guide it, and the second guide portion 120 is coupled to the QD sheet groove portion 53 of the QD sheet 50 and to guide it.

The first guide portion 110 is formed from the bottom chassis 84 in a lengthwise direction which is the widthwise direction of the bottom chassis 84 so that one side of the light guide plate 40 is seated. The widthwise direction may be defined as a direction perpendicular to the bottom chassis 84. In addition, since the top chassis 82 and the bottom chassis 84 are respectively coupled as front and rear chassis of the display module 10, the widthwise direction may refer to a direction from the top chassis 82 to the bottom chassis 84. The first guide portion 110 may include a first position guide portion 112 and a first seating portion 114.

The first position guide portion 112 is provided to guide a position of the light guide plate 40. At least one guide member 100 is provided at the chassis 80, and simultaneously guides the light guide plate 40 and the QD sheet 50. That is, the first position guide portion 112 of the guide member 100 is provided to guide the light guide plate 40 to an installation position thereof, when the light guide plate 40 is installed at the bottom chassis 84, and the second guide portion 120 is provided to guide the QD sheet 50 to an installation position thereof.

Since the light guide plate groove portion 43 corresponding to the first guide portion 110 is formed at the light guide plate seating portion 42 which protrudes from an edge of the light guide plate body 41, movement of light in the light guide plate body 41 may not be interfered.

In addition, the light guide plate groove portion 43 may also be formed in a groove shape at the edge of the light guide plate body 41.

In addition, since the light guide plate 40 is mainly formed in a rectangular parallelepiped shape, the light guide plate 40 may be distinguished into long sides and short sides, and since the display apparatus is vertically installed, the light guide plate 40 may be shifted downward due to gravity, and thus, the light guide plate 40 may be guided by the guide member 100 formed at the long side thereof and installed at the chassis 80.

In addition, the light guide plate groove portion 43 may be formed at a position in which a light source is not provided so that a light path of the light source disposed at an edge of the light guide plate 40 is not interfered. That is, in an exemplary embodiment, the light source is provided at an edge of the short side of the light guide plate 40, and the guide member 100 is formed at two positions of an upper portion and one position of a lower portion which are the long side of the light guide plate 40. Thus, as the three positions of the light guide plate 40 are guided, a position of the light guide plate 40 is aligned. In the exemplary embodiment, three guide members 100 are applied thereto, but the number of the guide members 100 is not limited.

The first seating portion 114 is provided to seat the light guide plate 40 guided by the first position guide portion 112. The first seating portion 114 may be separately formed to extend from the first position guide portion 112, and may also be formed on a surface of the first position guide portion 112. When the first seating portion 114 is separately formed to extend from the first position guide portion 112, a cross-sectional area of the first seating portion 114 is greater than a cross-sectional area of the first position guide portion 112, in the first guide portion 110.

In an exemplary embodiment, a cross-section of the first guide portion 110 is formed in a rectangular shape, and a cross-sectional area thereof may be gradually increased. In such a configuration, the light guide plate groove portion 43 of the light guide plate 40 which will be described later is seated on the first seating portion 114 through the first position guide portion 112.

Although a shape of the first seating portion 114 is not limited, in an exemplary embodiment, the first seating portion 114 may include a first seating surface 117 which has a flat surface and a cross-sectional area which increases toward the bottom chassis 84. The first seating surface 117 may be formed to have a cross-sectional area which gradually increases from the first seating portion 114 toward the bottom chassis 84. In addition, the first seating portion 114 may include a first seating curved surface 115 which has a cross-sectional area which gradually increases toward the bottom chassis 84. In addition, the first seating portion 114 may include a first supporting surface 116 formed in a flat surface perpendicular to the first position guide portion 112 so that one surface of the light guide plate 40 is seated thereon.

The first seating portion 114 may be provided to include at least one of the first seating curved surface 115, the first seating surface 117, and the first supporting surface 116. Even though it is illustrated that the light guide plate 40 is seated on the first seating surface 117, the light guide plate 40 may also be seated on the first seating curved surface 115, or the first supporting surface 116.

A seating position of the light guide plate 40 which is seated on the guide member 100 is guided by the first position guide portion 112, and the light guide plate 40 is seated on the first seating portion 114. Specifically, a seating position of the light guide plate groove portion 43 is guided by the first position guide portion 112, and the light guide plate groove portion 43 is seated on the first seating portion 114.

The second guide portion 120 may be formed to extend from the first guide portion 110. The second guide portion 120 may be provided to support the QD sheet 50.

The second guide portion 120 is formed from the bottom chassis 84 in a lengthwise direction which is the widthwise direction of the bottom chassis 84 so that one side of the QD sheet 50 is seated. The widthwise direction may be defined as a direction perpendicular to the bottom chassis 84. In addition, since the bottom chassis 84 is provided at the rear of the top chassis 82, from which the widthwise direction may also be defined a direction from the top chassis 82 to the bottom chassis 84.

The second guide portion 120 may include a second position guide portion 122, and a second seating portion 124.

The second position guide portion 122 is provided to guide a supporting position of the QD sheet 50. At least one guide member 100 is provided, and guides and supports the light guide plate 40 and the QD sheet 50. The second position guide portion 122 of the guide member 100 is provided to guide the QD sheet 50 to an installation position thereof when the QD sheet 50 is installed at the bottom chassis 84.

The QD sheet 50 may include a QD sheet body 51, and the QD sheet groove portion 53 which is formed at the QD sheet body 51 in a groove shape to be supported by the second guide portion 120 in the groove shape. The QD sheet body 51 may include a QD sheet seating portion 52 which is formed to protrude from the same surface of the QD sheet body 51. Since the QD sheet groove portion 53 is formed in the QD sheet seating portion 52, movement of light in the QD sheet body 51 may not be interfered by the second guide portion 120 provided at the QD sheet groove portion 53. The QD sheet groove portion 53 may be formed in the QD sheet seating portion 52, or may also be formed in the QD sheet body 51.

The guide member 100 according to an exemplary embodiment is formed at two positions of an upper portion and one position of a lower portion of the QD sheet 50, and thus the guide member 100 guides the three positions of the QD sheet 50, and determines a position of the QD sheet 50.

The second seating portion 124 is provided to seat the QD sheet 50 which is guided by the second position guide portion 122. The second seating portion 124 may be formed on a surface of the second position guide portion 122, or may also be separately formed from the second position guide portion 122.

The second seating portion 124 may also include a second supporting surface 126 formed in a flat surface perpendicular to the second position guide portion 122, and a second seating surface 127 formed at a surface of the second position guide portion 122, so that one surface of the QD sheet 50 is seated. However, a shape of the second seating portion 124 is not limited thereto, and the second seating portion 124 may be formed to include at least one of a second seating curved surface, the second seating surface 127, and the second supporting surface 126 as illustrated with the first seating portion 114. A shape of the second seating curved surface which is not described is the same as that of the first seating curved surface 115. In an exemplary embodiment, the second seating surface 127 and the second supporting surface 126 are applied and illustrated.

A seating position of the QD sheet 50 which is seated by the guide member 100 is guided by the second position guide portion 122, and the QD sheet 50 is seated on the second seating portion 124. Specifically, a seating position of the QD sheet groove portion 53 is guided by the second position guide portion 122, and the QD sheet groove portion 53 is seated on the second seating portion 124.

The second guide portion 120 may be formed to be stepped with respect to the first guide portion 110. Specifically, a cross-sectional area perpendicular to a lengthwise direction of the second position guide portion 122 may be less than a cross-sectional area perpendicular to a lengthwise direction of the first position guide portion 112. In addition, when the light guide plate 40 is installed at the first guide portion 110, the first guide portion 110 may be provided not to protrude higher than the light guide plate 40. That is, a height of the first guide portion 110 may be provided to correspond to a thickness of the light guide plate 40.

As described above, since the first guide portion 110 and the second guide portion 120 may be formed to be stepped to each other, and the first guide portion 110 is formed not to protrude higher than the light guide plate 40, the light guide plate 40 installed at the first guide portion 110 and the QD sheet 50 installed at the second guide portion 120 are formed to maintain adhesion to each other and to be independently installed at the guide member 100. Accordingly, when the light guide plate 40 is installed at the first guide portion 110 and the QD sheet 50 is installed at the second guide portion 120, no space is left between the light guide plate 40 and the QD sheet 50, and the light guide plate 40 and the QD sheet 50 are adhered to each other.

Since the second position guide portion 122 of the second guide portion 120 is formed to be stepped with respect to the first position guide portion 112 of the first guide portion 110 in all directions along the circumference thereof, a portion of the QD sheet 50 installed at the guide member 100 may be formed to be comparatively wider than a portion of the light guide plate 40 installed at the guide member 100. Accordingly, light which passes the light guide plate 40 may stably pass the QD sheet 50 even at a portion adjacent to the guide member 100.

The guide member 100 may include a member fixing portion 130.

The member fixing portion 130 is formed to fix the guide member 100 to the bottom chassis 84. The member fixing portion 130 is formed to extend from the first guide portion 110, and is fixed to the bottom chassis 84. Specifically, a coupling groove may be formed at the member fixing portion 130, and the coupling groove and the bottom chassis 84 may be coupled by screw coupling via fixation member 131. However, a coupling method of the member fixing portion 130 is not limited thereto.

The member fixing portion 130 may be provided at a lower portion of the light guide plate 40. That is, the member fixing portion 130 which fixes the guide member 100 to the bottom chassis 84 may be provided between the light guide plate 40 and the bottom chassis 84. Specifically, when a lengthwise direction of the guide portion refers to a supporting axis 100*a*, and when a direction in which the member fixing portion 130 is spaced apart from the supporting axis 100*a* and is fixed to the bottom chassis 84 refers to a coupling axis 130*a*, the coupling axis 130*a* may be provided to penetrate an inner portion of the light guide plate 40 or the QD sheet 50 rather than the supporting axis 100*a*.

Using such a configuration, the display apparatus 1 may be prevented from being widened due to the guide member 100, which supports the light guide plate 40 and the QD sheet 50. That is, space efficiency may be improved by the guide member 100.

In addition, when an apparatus is worn out, or when coupling is incompletely or loosely performed at the member fixing portion 130, the guide member 100 is swayed around the coupling axis 130*a* with respect to the bottom chassis 84. However, as the member fixing portion 130 is interposed between the light guide plate 40 and the bottom chassis 84, the guide member 100 may not be spaced apart from the light guide plate 40 and the QD sheet 50 even in such a case.

In addition, as the member fixing portion 130 is interposed between the light guide plate 40 and the bottom chassis 84, a portion which fixes the guide member 100 thereto may be covered.

The guide member 100 may include a position determination portion 140 which determines an installation position of the guide member 100.

The position determination portion 140 may be formed to extend from the first guide portion 110. The position determination portion 140 is formed to protrude from the first guide portion 110, and is coupled to the bottom chassis 84. Specifically, the position determination portion 140 is inserted into a position determination groove 142 of a rear surface of the bottom chassis 84. That is, a coupling position of the guide member 100 on the bottom chassis 84 is guided by the position determination portion 140, and the guide member 100 is fixed to the bottom chassis 84 by the member fixing portion 130. When the position determination portion 140 fixes the guide member 100 to the bottom chassis 84, the position determination portion 140 performs a temporal fixing function, and when a coupling is completely performed, the position determination portion 140 performs a function of assisting fixation so that the guide member 100 is firmly fixed to the bottom chassis 84.

Although a position of the position determination portion 140 is not limited, the position determination portion 140 is spaced apart from the coupling axis 130a of the member fixing portion 130. As a portion in which the guide member 100 is temporally fixed to the bottom chassis 84 by the position determination portion 140 and the coupling axis 130a are spaced apart from each other, the guide member 100 may be more firmly fixed to the bottom chassis 84. That is, the guide member 100 is coupled to the bottom chassis 84 by the member fixing portion 130, and even when the member fixing portion 130 is loosened, the positions of the guide member 100 and the member fixing portion 130 are supported by the position determination portion 140 separately provided from the member fixing portion 130.

Although a method of manufacturing the guide member 100 is not limited, the guide member 100 may be integrally formed using an injection mold method. In addition, the guide member 100 may be formed of a plastic. However, a material of the guide member 100 is not limited thereto, and an elastic material may also be applied thereto. For example, the guide member 100 may also be formed of a rubber.

In addition, when heat is generated inside the display module 10 due to the light source 30, the light guide plate 40 or the QD sheet 50 may be expanded. Here, the light guide plate 40 and the QD sheet 50 are primarily supported by the guide member 100 so that positions of the light guide plate 40 and the QD sheet 50 are not mismatched.

In addition, the guide member 100 may be formed in black color to prevent light emitted by a plurality of light sources from being reflected by the guide member 100.

The display apparatus 1 may include the middle mold 70.

In an exemplary embodiment, as the middle mold 70 is coupled to the bottom chassis 84 at an edge of the front of the light guide plate 40 and provided thereat, the middle mold 70 may be provided to fix the light guide plate 40 and the QD sheet 50, and to support the optical sheet 60 and/or the display panel 20.

The middle mold 70 includes a middle body 72, and a pressing rib 74.

The middle body 72 is coupled to the bottom chassis 84. The middle body 72 is formed to be coupled along a circumferential surface of the bottom chassis 84.

Specifically, the middle body 72 includes a first body coupling portion 72a which is coupled to an inside of the side surface portion 84b of the bottom chassis 84, and a second body coupling portion 72b which is coupled to an outside of the side surface portion 84b of the bottom chassis 84. Using such a configuration, the middle mold 70 is coupled to the bottom chassis 84 so that the side surface portion 84b of the bottom chassis 84 is positioned between the first body coupling portion 72a and the second body coupling portion 72b.

The pressing rib 74 is formed to extend from the middle body 72, and is provided to have an end which is positioned in front of the light guide plate 40 and the QD sheet 50. When the middle mold 70 is coupled to the bottom chassis 84, the pressing rib 74 is provided to press the QD sheet 50 and the light guide plate 40 together toward the bottom chassis 84. Accordingly, the QD sheet 50 and the light guide plate 40 may be adhered to each other. In addition, the light guide plate 40 and the QD sheet 50 seated on the guide member 100 are fixed to each other.

The pressing rib 74 may be formed along at least a part of a circumference of the QD sheet 50 and the light guide plate 40. Since the middle mold 70 may be formed along a circumference of the bottom chassis 84, the pressing rib 74 may be formed along an entire circumference of the QD sheet 50 and the light guide plate 40.

In addition, since the pressing rib 74 is formed to extend from the middle body 72 and to have an end which reaches a front surface of the QD sheet 50, the pressing rib 74 may not expose the guide member 100 to the outside. That is, the guide member 100 may be covered by the pressing rib 74, and the guide member 100 may not be influenced from the outside.

Hereinafter, an assembly method of the display apparatus 1 according to an exemplary embodiment will be described.

Figure 8:
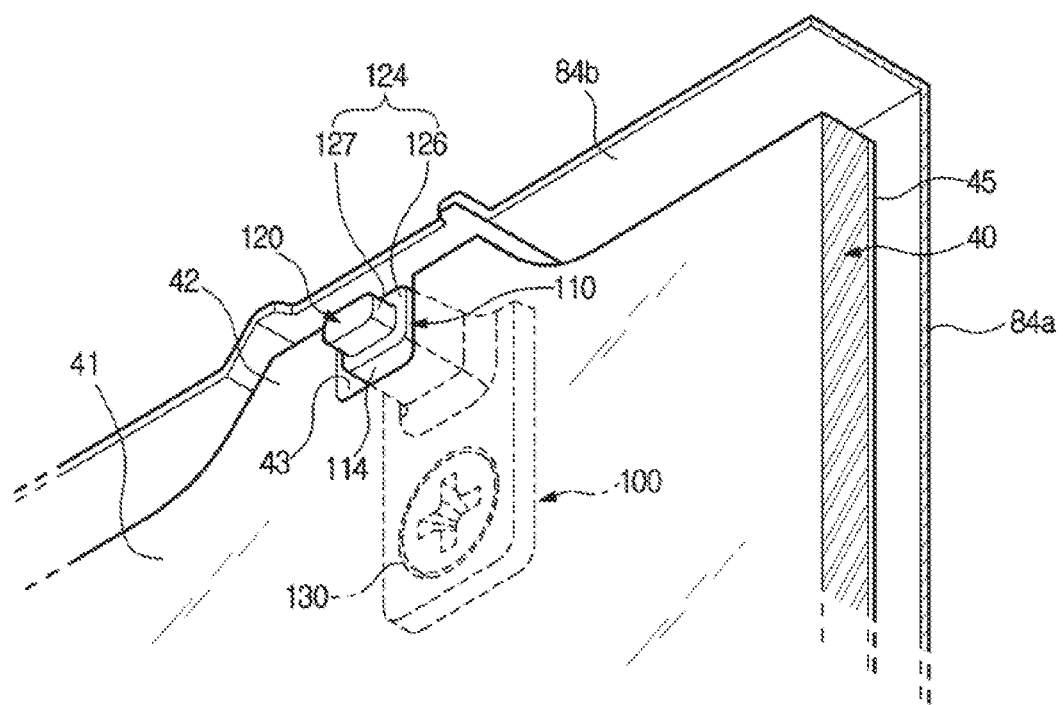
FIGS. 8, 9, and 10 are views illustrating an assembly process of the display apparatus according to an exemplary embodiment.
Figure 9:
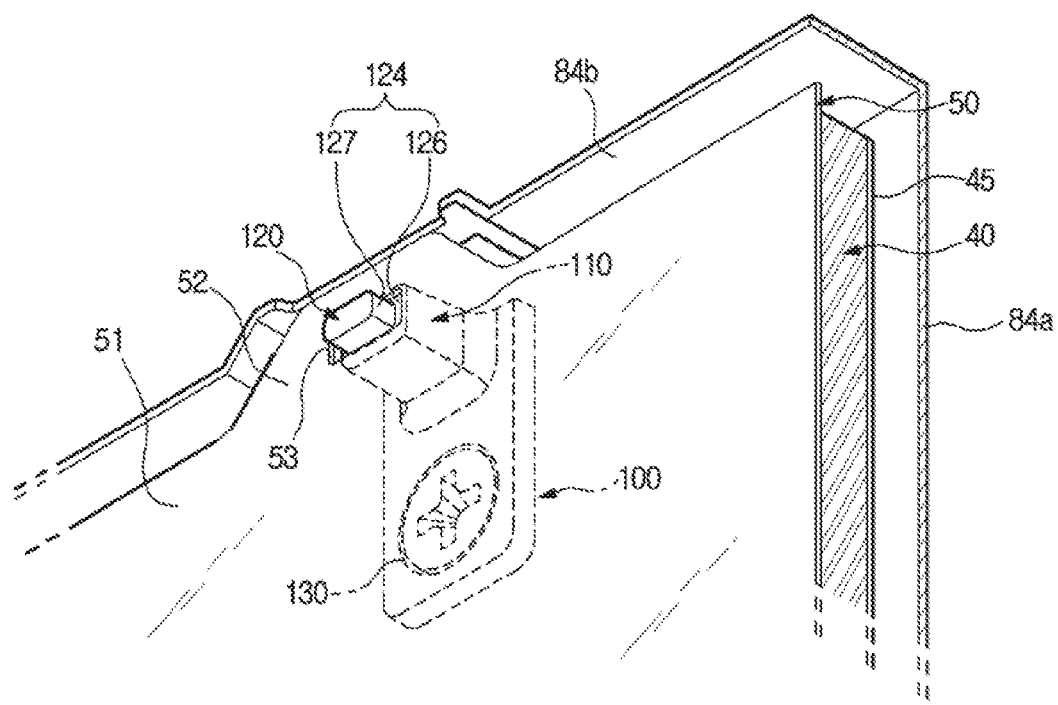
Figure 10:
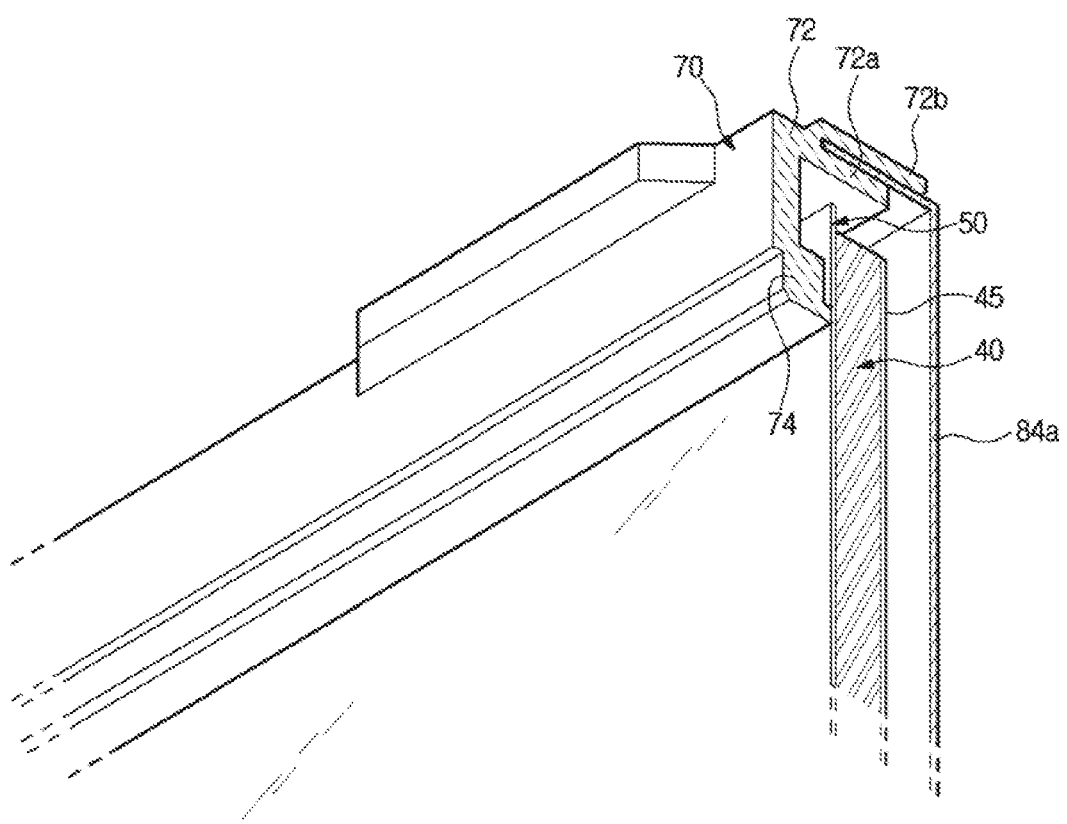

FIGS. 8 to 10 are views illustrating an assembly process of the display apparatus according to an exemplary embodiment.

The guide member 100 is temporally fixed to the bottom chassis 84 using the position determination portion 140 of the guide member 100. After the guide member 100 is temporally fixed to the bottom chassis 84, the member fixing portion 130 and the bottom chassis 84 are screw-coupled, and the guide member 100 is fixed to the bottom chassis 84.

After the guide member 100 is coupled to the bottom chassis 84, the light guide plate 40 is seated on the first guide portion 110. Specifically, the light guide plate groove portion 43 is guided along the first position guide portion 112 of the first guide portion 110, and is seated on the first seating portion 114.

After the light guide plate 40 is seated on the first guide portion 110, the QD sheet 50 is seated on the second guide portion 120. Specifically, the QD sheet groove portion 53 is guided along the second position guide portion 122 of the second guide portion 120, and is seated on the second seating portion 124.

In an exemplary embodiment, the guide members 100 are provided at two positions corresponding to an upper portion of the light guide plate 40 and the QD sheet 50, and one position corresponding to a lower portion of the light guide plate 40 and the QD sheet 50, and the guide members 100 seat the light guide plate 40 and the QD sheet 50.

A position and the number of the guide members 100 are not limited to the above description. For example, the guide member 100 may be provided at one position of the upper portion and two positions of the lower portion of the light guide plate 40 and the QD sheet 50, and may be provided at a position at which the light source is provided, and a plurality of guide members 100 may also be provided along a circumference of the light guide plate 40 and the QD sheet 50.

When the light guide plate 40 and the QD sheet 50 are seated on the guide member 100, the middle mold 70 is coupled to the bottom chassis 84. When the middle body 72 is coupled to the bottom chassis 84, the pressing rib 74 presses the light guide plate 40 and the QD sheet 50 toward the bottom chassis 84, that is, in a backward direction.

Accordingly, both of the light guide plate 40 and the QD sheet 50 may be seated using the guide member 100, and both of the light guide plate 40 and the QD sheet 50 are pressed together by pressing rib 74.

Hereinafter, a display apparatus according to another exemplary embodiment will be described.

In descriptions of the following exemplary embodiment, the descriptions of redundant configurations will be omitted.

Figure 11:
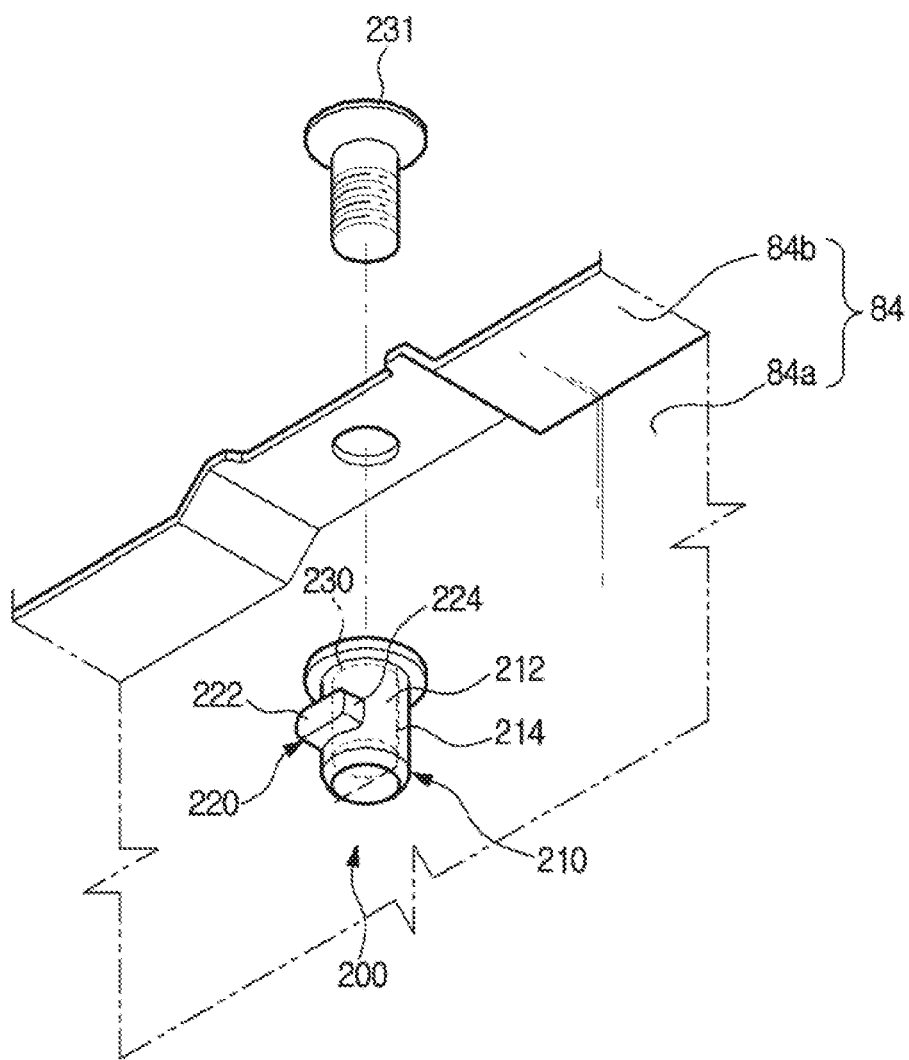
FIG. 11 is a view illustrating coupling of a guide member and a chassis of a display apparatus according to another exemplary embodiment.
Figure 12:
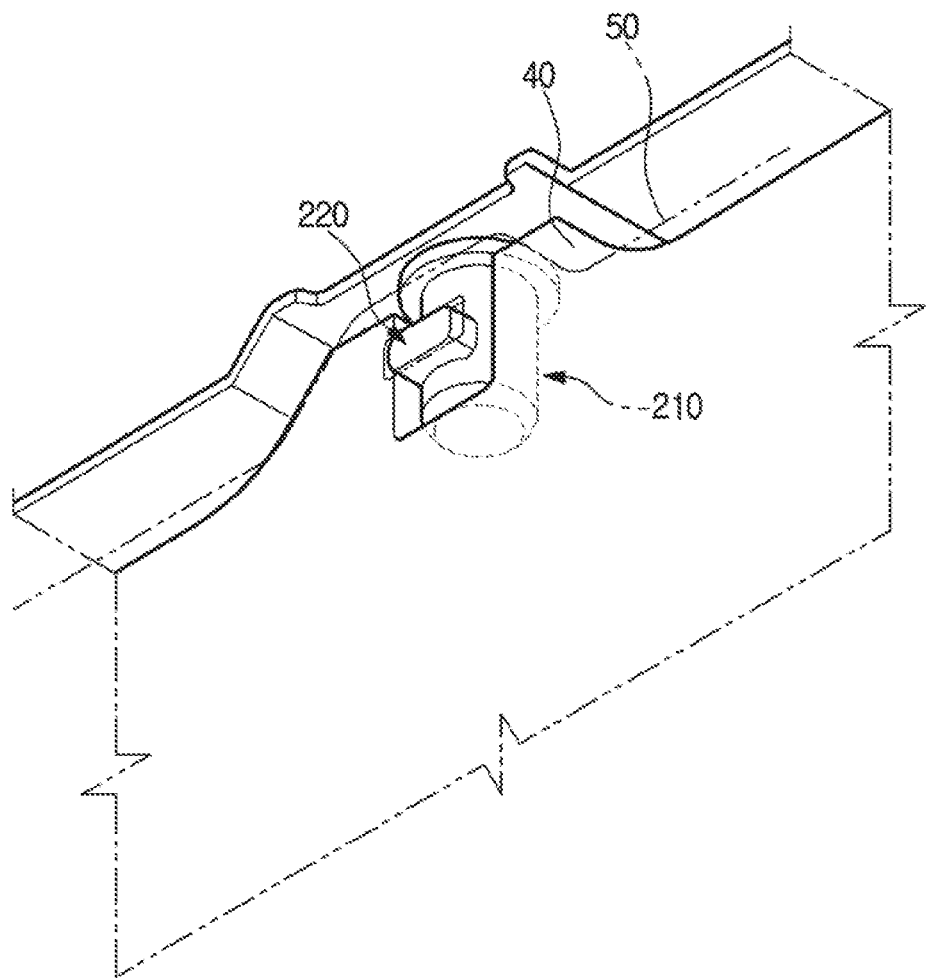
FIG. 12 is a perspective view illustrating the guide member and a configuration adjacent thereto of the display apparatus according to another exemplary embodiment.

FIG. 11 is a view illustrating coupling of a guide member and a chassis of a display apparatus according to another exemplary embodiment, and FIG. 12 is a perspective view illustrating the guide member and a configuration adjacent thereto of the display apparatus according to another exemplary embodiment.

A display apparatus 1 may include a guide member 200. The guide member 200 is provided to fix a light guide plate 40 and a QD sheet 50. In order to improve color reproducibility using the QD sheet 50, light emitted through the light guide plate 40 passes the QD sheet 50. To this end, the guide member 200 is provided to fix the light guide plate 40 and the QD sheet 50.

The guide member 200 may be fixed to an inside of a chassis 80. Specifically, the guide member 200 may be fixed to a bottom chassis 84. At least one guide member 200 is provided to fix or seat components inside the chassis 80.

The guide member 200 may include a guide portion provided to fix or seat the components inside the chassis 80.

A first guide portion 210 is provided to support the light guide plate 40, and a second guide portion 220 is provided to support the QD sheet 50.

The first guide portion 210 is formed in a lengthwise direction which is a direction from a side surface portion 84b of the bottom chassis 84 toward an inside of the bottom chassis 84 so that one side of the light guide plate 40 is seated. Since the first guide portion 210 is formed in the direction from the side surface portion 84b of the bottom chassis 84 toward the inside of the bottom chassis 84, the first guide portion 210 may be provided to support a side surface of a light guide plate groove portion 43 of the light guide plate 40.

A shape of the first guide portion 210 is not limited, but in an exemplary embodiment, it may be provided in a cylindrical shape.

The first guide portion 210 may include a first position guide portion 212 and a first seating portion 214.

The first position guide portion 212 is provided to define a supporting position of the light guide plate 40. At least one guide member 200 is provided, and supports the light guide plate 40 and the QD sheet 50. When the light guide plate 40 is installed in the bottom chassis 84, the first position guide portion 212 of the guide member 200 is provided to guide the light guide plate 40 to an installation position.

The first seating portion 214 is provided to seat the light guide plate 40 guided by the first position guide portion 212. The first seating portion 214 may be separately formed to extend from the first position guide portion 212, and may also be formed at a surface of the first position guide portion 212.

In an exemplary embodiment, the first position guide portion 212 may be formed in a curved surface forming a front surface of the first guide portion 210 having the cylindrical shape or a curved surface provided at an end of the first guide portion. Here, the front surface of the first guide portion 210 means a surface which faces in a forward direction of the display apparatus 1. The first seating portion 214 may be formed in a curved surface forming a side portion of the first guide portion 210 or a curved surface provided at the end of the first guide portion. That is, the curved surface provided at the end of the first guide portion 210 may perform functions of the first position guide portion 212 and the first seating portion 214.

The second guide portion 220 may be formed to extend from the first guide portion 210. The second guide portion 220 may be formed to support the QD sheet 50.

The second guide portion 220 is formed in a lengthwise direction which is a widthwise direction of the bottom chassis 84 so that one side of the QD sheet 50 is seated. The widthwise direction may be defined as a direction perpendicular to the bottom chassis 84. In addition, since a top chassis 82 and the bottom chassis 84 are respectively coupled as front and rear chassis of the display apparatus 1, the widthwise direction may be defined as a direction from the top chassis 82 to the bottom chassis 84.

A shape of the second guide portion 220 is not limited, but in an exemplary embodiment, may be formed to have a length greater than a height. Based on seeing the display apparatus 1 from the front thereof, since the second guide portion 220 is formed to have the length greater than the height, the second guide portion 220 may stably support the QD sheet 50 in a direction of gravity, and may prevent from mismatching in a lengthwise direction.

The second guide portion 220 may include a second position guide portion 222 and a second seating portion 224.

The second position guide portion 222 is provided to determine a supporting position of the QD sheet 50. At least one guide member 200 is provided, and supports the light guide plate 40 and the QD sheet 50. When the QD sheet 50 is installed in the bottom chassis 84, the second position guide portion 222 of the guide member 200 is provided to guide the QD sheet 50 to an installation position.

The second seating portion 224 is provided to seat QD sheet 50 guided by the second position guide portion 222. The second seating portion 224 may be formed on a surface of the second position guide portion 222, or may also be separately formed from the second position guide portion 222.

A seating position of the QD sheet 50 seated on the guide member 200 is guided by the second position guide portion 222, and the QD sheet 50 is seated on the second seating portion 224. Specifically, an installation position of a QD sheet groove portion 53 is guided by the second position guide portion 222, and the QD sheet groove portion 53 is seated on the second seating portion 224.

The second guide portion 220 may be formed to be stepped with respect to the first guide portion 210. Specifically, a lengthwise cross-sectional area of the second position guide portion 222 may be less than a lengthwise cross-sectional area of the first position guide portion 212. In addition, when the light guide plate 40 is installed at the first guide portion 210, the first guide portion 210 may be formed not to protrude higher than the light guide plate 40.

As described above, since the first guide portion 210 and the second guide portion 220 are formed to be stepped with respect to each other, and the first guide portion 210 is provided not to protrude higher than the light guide plate 40, the light guide plate 40 installed at the first guide portion 210 and the QD sheet 50 installed at the second guide portion 220 are provided not to interfere with each other and are installed at the guide member 200. Accordingly, when the light guide plate 40 is installed at the first guide portion 210 and the QD sheet 50 is installed at the second guide portion 220, no space is left between the light guide plate 40 and the QD sheet 50, and the light guide plate 40 and the QD sheet 50 are provided to adhere to each other.

Since the second position guide portion 222 of the second guide portion 220 is formed to be stepped with respect to the first position guide portion 212 of the first guide portion 210 in all directions along the circumference thereof, a portion of the QD sheet 50 installed at the guide member 200 may be formed to be comparatively wider than a portion of the light guide plate 40 installed at the guide member 200. Accordingly, light which passes the light guide plate 40 may stably pass the QD sheet 50 even at a portion adjacent to the guide member 200.

The guide member 200 may include a member fixing portion 230.

The member fixing portion 230 is formed to fix the guide member 200 to the bottom chassis 84. The member fixing portion 230 is formed to extend from the first guide portion 210, and is fixed to the bottom chassis 84. Specifically, a coupling groove may be formed at the member fixing portion 230, and the coupling groove and the bottom chassis 84 may be coupled by screw-coupling via fixation member 231. However, a coupling method of the member fixing portion 230 is not limited thereto.

The member fixing portion 230 may be provided to correspond to the side surface portion 84b of the bottom chassis 84. That is, the member fixing portion 230 configured to fix the guide member 200 to the bottom chassis 84 is provided to correspond to the side surface portion 84b of the bottom chassis 84. Using such a configuration, interference of light by the guide member 200 may be minimized while the light generated from a light source 30 passes the light guide plate 40 and the QD sheet 50.

Hereinafter, a display apparatus according to still another exemplary embodiment will be described.

In descriptions of the following exemplary embodiment, the descriptions of redundant configurations will be omitted.

Figure 13:
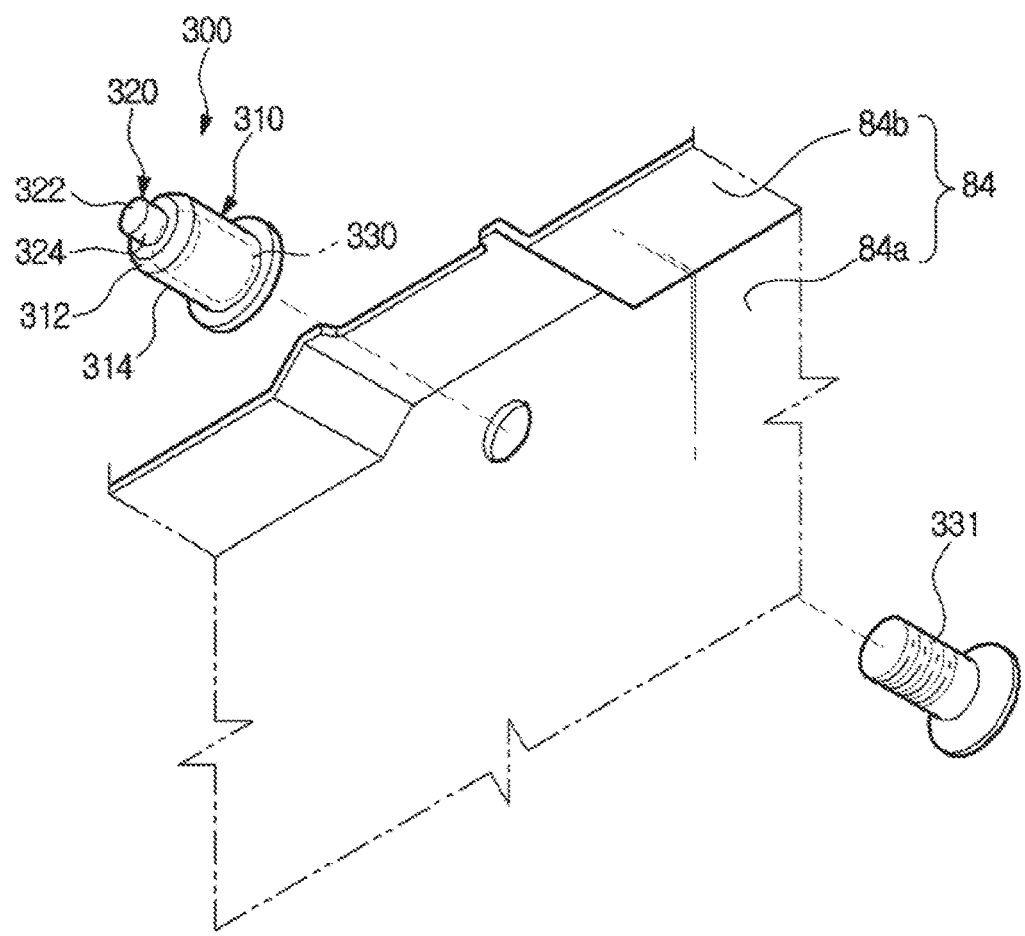
FIG. 13 is a view illustrating coupling of a guide member and a chassis of a display apparatus according to still another exemplary embodiment.
Figure 14:
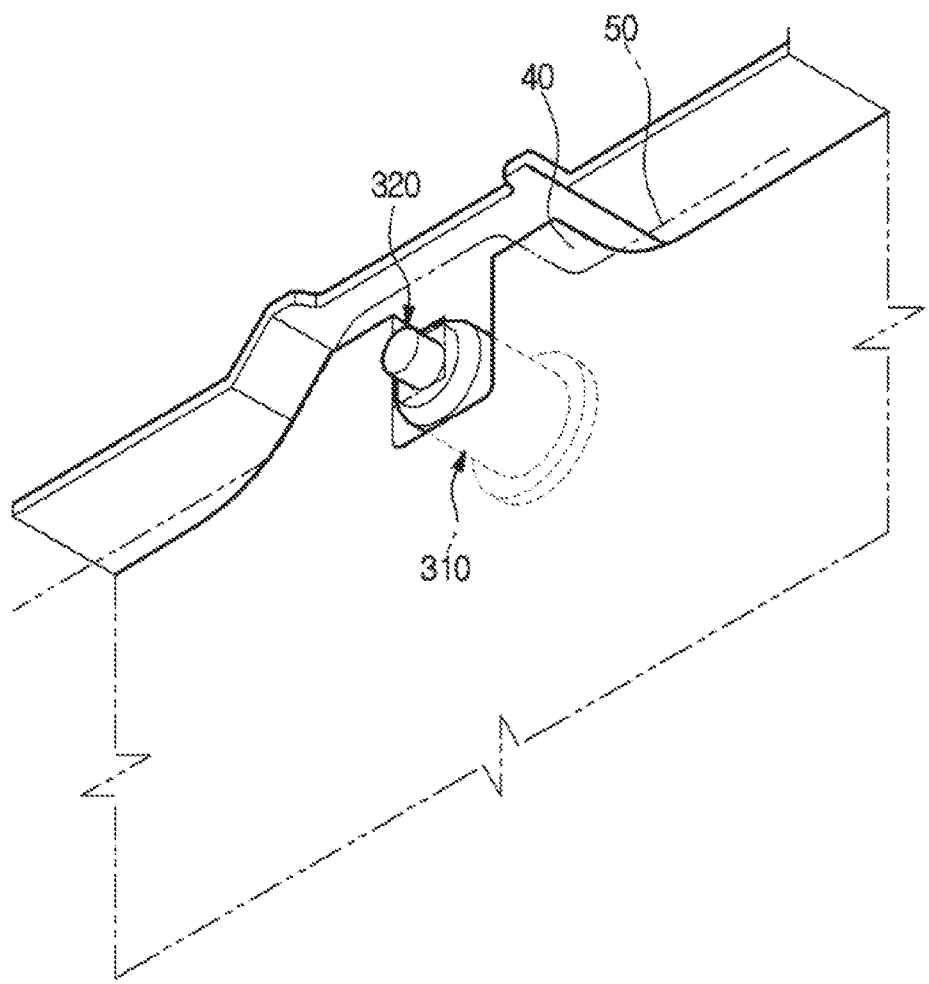
FIG. 14 is a perspective view illustrating the guide member and a configuration adjacent thereto of the display apparatus according to still another exemplary embodiment.

FIG. 13 is a view illustrating coupling of a guide member and a chassis of a display apparatus according to still another exemplary embodiment, and FIG. 14 is a perspective view illustrating the guide member and a configuration adjacent thereto of the display apparatus according to still another exemplary embodiment.

A display apparatus 1 may include a guide member 300. The guide member 300 is provided to fix a light guide plate 40 and a QD sheet 50. In order to improve color reproducibility using the QD sheet 50, light emitted through the light guide plate 40 passes the QD sheet 50. To this end, the guide member 300 is provided to fix the light guide plate 40 and the QD sheet 50.

The guide member 300 may be fixed to an inside of a chassis 80. Specifically, the guide member 300 may be fixed to a bottom chassis 84. At least one guide member 300 is provided to fix or seat components inside the chassis 80.

The guide member 300 may include a guide portion provided to fix or seat the components inside the chassis 80.

A first guide portion 310 is provided to support the light guide plate 40, and a second guide portion 320 is provided to support the QD sheet 50.

The first guide portion 310 is formed from the bottom chassis 84 in a lengthwise direction which is a widthwise direction of the bottom chassis 84 so that one side of the light guide plate 40 is seated. The widthwise direction may be defined as a direction perpendicular to the bottom chassis 84. In addition, since a top chassis 82 and the bottom chassis 84 are respectively coupled as front and rear chassis of the display apparatus 1, the widthwise direction may be defined as a direction from the top chassis 82 to the bottom chassis 84.

The first guide portion 310 may include a first position guide portion 312, and a first seating portion 314.

The first position guide portion 312 is provided to determine a supporting position of the light guide plate 40. At least one guide member 300 is provided, and supports the light guide plate 40 and the QD sheet 50. The first position guide portion 312 of the guide member 300 is provided to guide the light guide plate 40 to an installation position when the light guide plate 40 is installed at the bottom chassis 84.

The first seating portion 314 is provided to seat the light guide plate 40 guided by the first position guide portion 312. The first seating portion 314 may also be formed on a surface of the first position guide portion 312.

A seating position of the light guide plate 40 seated on the guide member 300 is guided by the first position guide portion 312, and the light guide plate 40 is seated on the first seating portion 314. Specifically, a seating position of a light guide plate groove portion 43 is guided by the first position guide portion 312, and the light guide plate groove portion 43 is seated on the first seating portion 314.

The second guide portion 320 may be formed to extend from the first guide portion 310. The second guide portion 320 may be provided to support the QD sheet 50.

The second guide portion 320 is formed in a lengthwise direction which is the widthwise direction of the bottom chassis 84 so that one side of the QD sheet 50 is seated. The widthwise direction may be defined as a direction perpendicular to the bottom chassis 84. In addition, since the top chassis 82 and the bottom chassis 84 are respectively coupled as front and rear chassis of the display apparatus 1, the widthwise direction may be defined as a direction from the top chassis 82 to the bottom chassis 84.

The second guide portion 320 may include a second position guide portion 322 and a second seating portion 324.

The second position guide portion 322 is provided to determine a supporting position of the QD sheet 50. At least one guide member 300 is provided, and supports the light guide plate 40 and the QD sheet 50. When the QD sheet 50 is installed in the bottom chassis 84, the second position guide portion 322 of the guide member 300 is provided to guide the QD sheet 50 to an installation position.

A seating position of the QD sheet 50 seated on the guide member 300 is guided by the second position guide portion 322, and the QD sheet 50 is seated on the second seating portion 324. Specifically, an installation position of a QD sheet groove portion 53 is guided by the second position guide portion 322, and the QD sheet groove portion 53 is seated on the second seating portion 324.

The second guide portion 320 may be formed to be stepped with respect to the first guide portion 310. Specifically, a lengthwise cross-sectional area of the second position guide portion 322 may be less than a lengthwise cross-sectional area of the first position guide portion 312. In addition, when the light guide plate 40 is installed at the first guide portion 310, the first guide portion 310 may be formed not to protrude higher than the light guide plate 40.

As described above, since the first guide portion 310 and the second guide portion 320 are formed to be stepped with respect to each other, and the first guide portion 310 is provided not to protrude higher than the light guide plate 40. The light guide plate 40 installed at the first guide portion 310 and the QD sheet 50 installed at the second guide portion 320 are provided not to interfere with each other and are installed at the guide member 300. Accordingly, when the light guide plate 40 is installed at the first guide portion 310 and the QD sheet 50 is installed at the second guide portion 320, no space is left between the light guide plate 40 and the QD sheet 50, and the light guide plate 40 and the QD sheet 50 are provided to adhere to each other.

Since the second position guide portion 322 of the second guide portion 320 is formed to be stepped with respect to the first position guide portion 312 of the first guide portion 310 in all directions along the circumference thereof, a portion of the QD sheet 50 installed at the guide member 300 may be formed to be comparatively wider than a portion of the light guide plate 40 installed at the guide member 300. Accordingly, light which passes the light guide plate 40 may stably pass the QD sheet 50 even at a portion adjacent to the guide member 300.

The guide member 300 may include a member fixing portion 330.

The member fixing portion 330 is formed to fix the guide member 300 to the bottom chassis 84. The member fixing portion 330 is formed to extend from the first guide portion 310, and is fixed to the bottom chassis 84. Specifically, a coupling groove may be formed at the member fixing portion 330, and the coupling groove and the bottom chassis 84 may be coupled by screw-coupling via fixation member 331. However, a coupling method of the member fixing portion 330 is not limited thereto.

The member fixing portion 330 may be provided to correspond to a rear surface portion 84a of the bottom chassis 84. That is, the member fixing portion 330 configured to fix the guide member 300 to the bottom chassis 84 is provided to correspond to the rear surface portion 84a of the bottom chassis 84. Using such a configuration, interference of light by the guide member 300 may be minimized while the light generated from a light source passes the light guide plate 40 and the QD sheet 50. The above-described first guide portion 310 and second guide portion 320 may be formed to extend from the member fixing portion 330 in forward and backward directions.

Hereinafter, a display apparatus according to yet another exemplary embodiment will be described.

In descriptions of the following exemplary embodiment, the descriptions of redundant configurations will be omitted.

Figure 15:
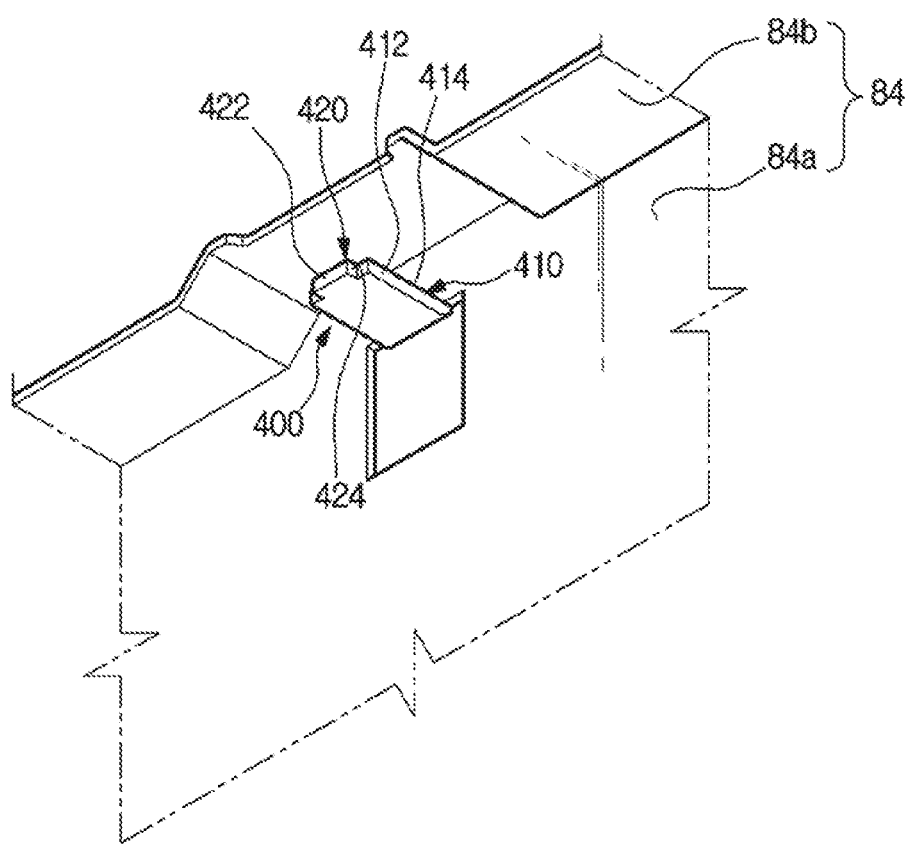
FIG. 15 is a view illustrating coupling of a guide member and a chassis of a display apparatus according to yet another exemplary embodiment.
Figure 16:
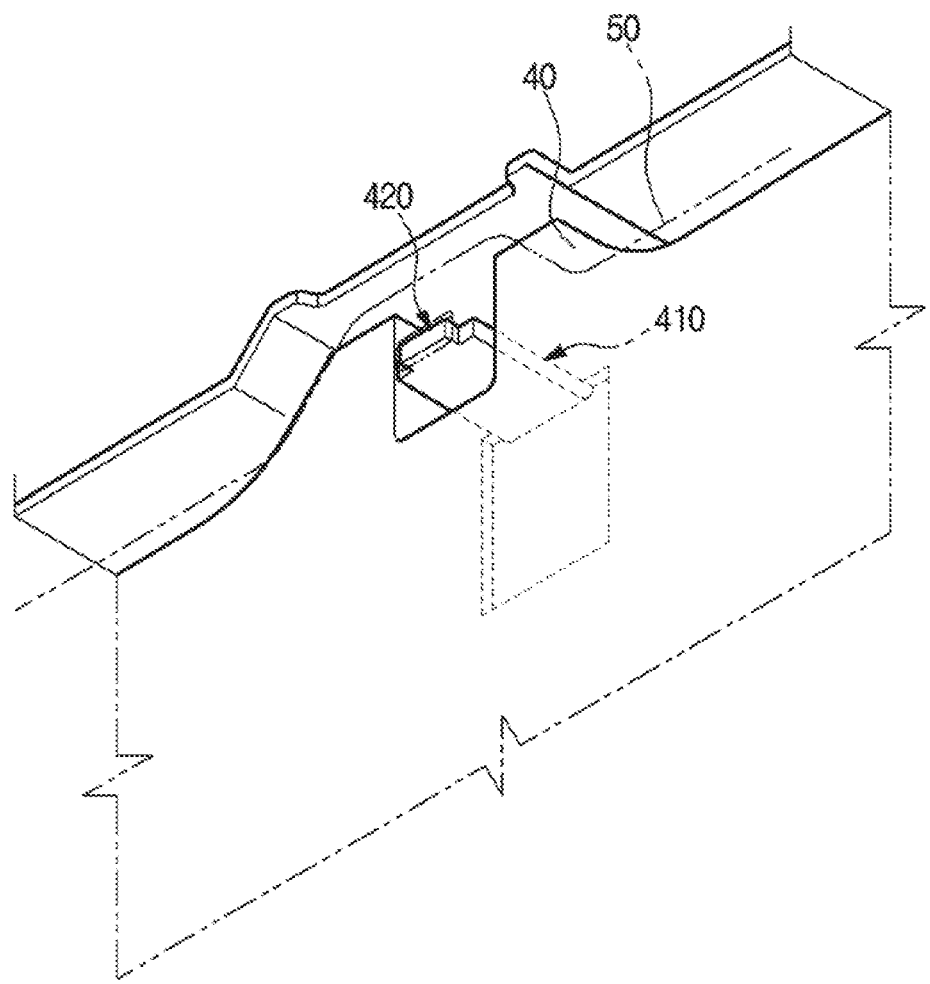
FIG. 16 is a perspective view illustrating the guide member and a configuration adjacent thereto of the display apparatus according to yet another exemplary embodiment.

FIG. 15 is a view illustrating coupling of a guide member and a chassis of a display apparatus according to yet another exemplary embodiment, and FIG. 16 is a perspective view illustrating the guide member and a configuration adjacent thereto of the display apparatus according to yet another exemplary embodiment.

A display apparatus 1 may include a guide member 400. The guide member 400 is provided to fix a light guide plate 40 and a QD sheet 50. In order to improve color reproducibility using the QD sheet 50, light emitted through the light guide plate 40 passes the QD sheet 50. To this end, the guide member 400 is provided to fix the light guide plate 40 and the QD sheet 50.

The guide member 400 may be integrally formed with a bottom chassis 84. Specifically, the guide member 400 may be formed to extend from a rear surface portion 84a of the bottom chassis 84.

In an exemplary embodiment, the guide member 400 may be integrally formed with the rear surface portion 84a of the bottom chassis 84, and may be formed by being bent from the rear surface portion 84a of the bottom chassis 84 as a part of the rear surface portion 84a of the bottom chassis 84.

The guide member 400 may include a guide portion configured to fix or seat components of an inside of a chassis 80.

A first guide portion 410 is provided to support the light guide plate 40, and a second guide portion 420 is provided to support the QD sheet 50.

The first guide portion 410 is formed from the bottom chassis 84 in a lengthwise direction which is a widthwise direction of the bottom chassis 84 so that one side of the light guide plate 40 is seated. The widthwise direction may be defined as a direction perpendicular to the bottom chassis 84. In addition, since a top chassis 82 and the bottom chassis 84 are respectively coupled as front and rear chassis of the display apparatus 1, the widthwise direction may be defined as a direction from the top chassis 82 to the bottom chassis 84.

The first guide portion 410 may be integrally formed with the rear surface portion 84a of the bottom chassis 84, and may be formed to extend and be bent from the rear surface portion 84a of the bottom chassis 84. In addition, the first guide portion 410 may be vertically formed to the rear surface portion 84a of the bottom chassis 84.

Since the first guide portion 410 is formed as a part of the rear surface portion 84a of the bottom chassis 84, the first guide portion 410 may be formed in a plate shape.

The first guide portion 410 may include a first position guide portion 412 and a first seating portion 414.

The first position guide portion 412 is provided to determine a supporting position of the light guide plate 40. At least one guide member 400 is provided, and it supports the light guide plate 40 and the QD sheet 50. The first position guide portion 412 of the guide member 400 is provided to guide the light guide plate 40 to an installation position, when the light guide plate 40 is installed at the bottom chassis 84.

The first seating portion 414 is provided to seat the light guide plate 40 guided by the first position guide portion 412. The first seating portion 414 may be separately formed to extend from the first position guide portion 412, and may also be formed on a surface of the first position guide portion 412.

A seating position of the light guide plate 40 seated on the guide member 400 is guided by the first position guide portion 412, and the light guide plate 40 is seated on the first seating portion 414. Specifically, a seating position of a light guide plate groove portion 43 is guided by the first position guide portion 412, and the light guide plate groove portion 43 is seated on the first seating portion 414.

The second guide portion 420 may be formed to extend from the first guide portion 410. The second guide portion 420 may be provided to support the QD sheet 50.

The second guide portion 420 is formed in a lengthwise direction which is the widthwise direction of the bottom chassis 84 so that one side of the QD sheet 50 is seated. The widthwise direction may be defined as a direction perpendicular to the bottom chassis 84. In addition, since the top chassis 82 and the bottom chassis 84 are respectively coupled as front and rear chassis of the display apparatus 1, the widthwise direction may be defined as a direction from the top chassis 82 to the bottom chassis 84.

The second guide portion 420 may include a second position guide portion 422 and a second seating portion 424.

The second position guide portion 422 is provided to guide a supporting position of the QD sheet 50. At least one guide member 400 is provided, and it supports the light guide plate 40 and the QD sheet 50. When the QD sheet 50 is installed in the bottom chassis 84, the second position guide portion 422 of the guide member 400 is provided to guide the QD sheet 50 to an installation position.

A seating position of the QD sheet 50 seated on the guide member 400 is guided by the second position guide portion 422, and the QD sheet 50 is seated on the second seating portion 424. Specifically, an installation position of a QD sheet groove portion 53 is guided by the second position guide portion 422, and the QD sheet groove portion 53 is seated on the second seating portion 424.

The second guide portion 420 may be formed to be stepped with respect to the first guide portion 410. Specifically, a lengthwise cross-sectional area of the second position guide portion 422 may be less than a lengthwise cross-sectional area of the first position guide portion 412. In addition, when the light guide plate 40 is installed at the first guide portion 410, the first guide portion 410 may be formed not to protrude higher than the light guide plate 40.

As described above, since the first guide portion 410 and the second guide portion 420 are formed to be stepped with respect to each other, and the first guide portion 410 is provided not to protrude higher than the light guide plate 40, the light guide plate 40 installed at the first guide portion 410 and the QD sheet 50 installed at the second guide portion 420 are provided not to interfere with each other, and are installed at the guide member 400. Accordingly, when the light guide plate 40 is installed at the first guide portion 410 and the QD sheet 50 is installed at the second guide portion 420, no space is left between the light guide plate 40 and the QD sheet 50, and the light guide plate 40 and the QD sheet 50 are provided to adhere to each other.

Since the second position guide portion 422 of the second guide portion 420 is formed to be stepped with respect to the first position guide portion 412 of the first guide portion 410 in all directions along the circumference thereof, a portion of the QD sheet 50 installed at the guide member 400 may be formed to be comparatively wider than a portion of the light guide plate 40 installed at the guide member 400. Accordingly, light which passes the light guide plate 40 may stably pass the QD sheet 50 even at a portion adjacent to the guide member 400.

Hereinafter, a display apparatus according to yet another exemplary embodiment will be described.

In descriptions of the following exemplary embodiment, the descriptions of redundant configurations will be omitted.

Figure 17:
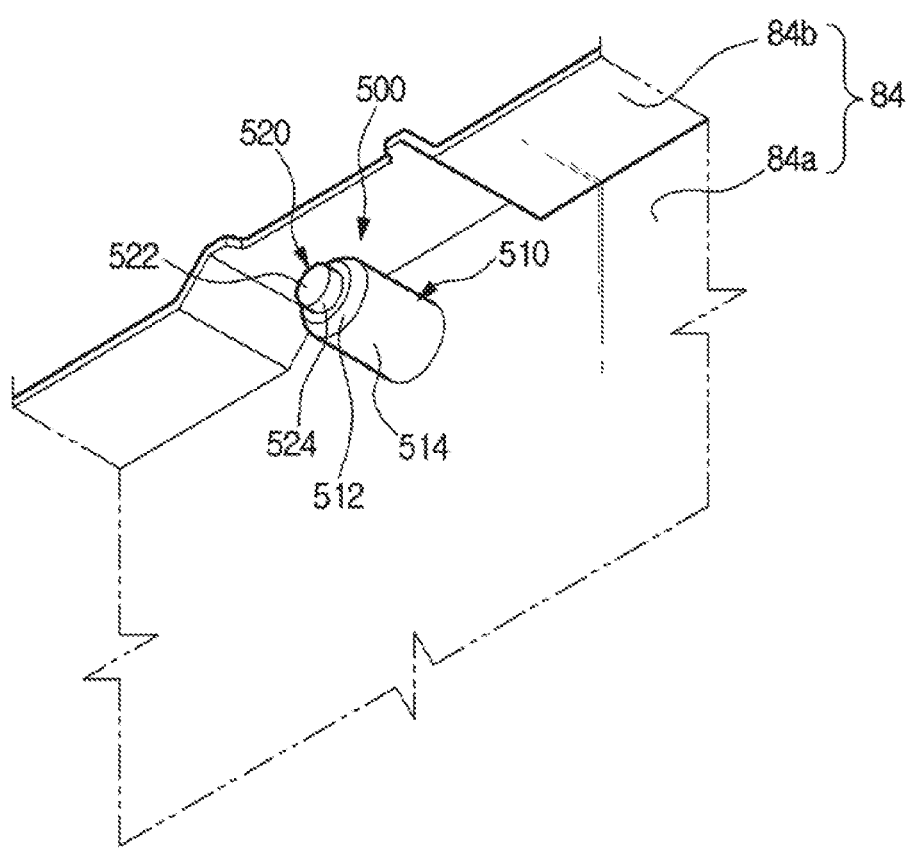
FIG. 17 is a view illustrating coupling of a guide member and a chassis of a display apparatus according to yet another exemplary embodiment.
Figure 18:
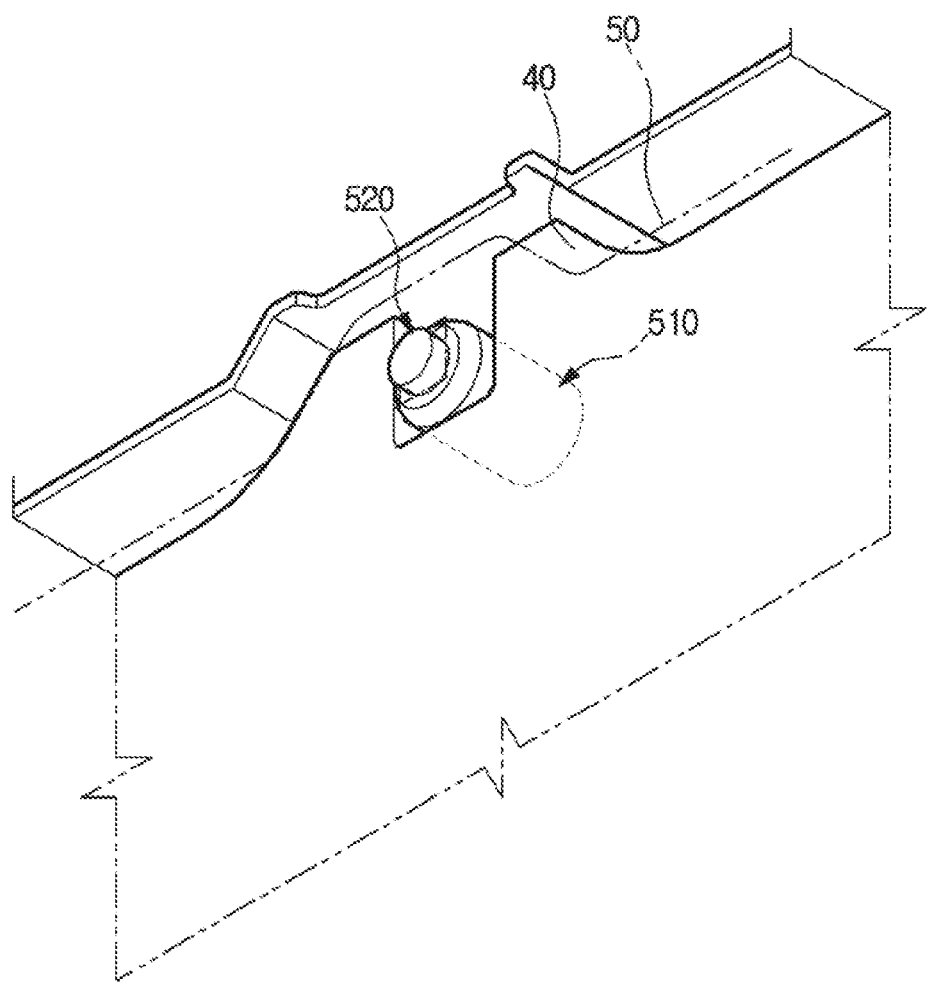
FIG. 18 is a perspective view illustrating the guide member and a configuration adjacent thereto of the display apparatus according to yet another exemplary embodiment.

FIG. 17 is a view illustrating coupling of a guide member and a chassis of a display apparatus according to yet another exemplary embodiment, and FIG. 18 is a perspective view illustrating the guide member and a configuration adjacent thereto of the display apparatus according to yet another exemplary embodiment.

A display apparatus 1 may include a guide member 500. The guide member 500 is provided to fix a light guide plate 40 and a QD sheet 50. In order to improve color reproducibility using the QD sheet 50, light emitted through the light guide plate 40 passes the QD sheet 50. To this end, the guide member 500 is provided to fix the light guide plate 40 and the QD sheet 50.

The guide member 500 may be fixed to an inside of a chassis 80. Specifically, the guide member 500 may be fixed to a bottom chassis 84. At least one guide member 500 is provided, and it fixes or seats components inside the chassis 80.

The guide member 500 may include a guide portion configured to fix or seat components of an inside of the chassis 80.

A first guide portion 510 is provided to support the light guide plate 40, and a second guide portion 520 is provided to support the QD sheet 50.

Configuration of the first guide portion 510 and the second guide portion 520 of the guide member 500 may be similar to the first guide portion 110 and the second guide portion 120.

However, the guide member 500 may be integrally formed with the bottom chassis 84. Specifically, the guide member 500 may be formed to extend from a rear surface portion 84a of the bottom chassis 84.

The guide member 500 according to an exemplary embodiment may be integrally formed with the rear surface portion 84a of the bottom chassis 84, and may be provided to protrude from the rear surface portion 84a of the bottom chassis 84 as a part of the rear surface portion 84a of the bottom chassis 84.

The guide member 500 may include a guide portion configured to fix or seat components of an inside of a chassis 80.

A first guide portion 510 is provided to support the light guide plate 40, and a second guide portion 520 is provided to support the QD sheet 50. For example, the first guide portion 510 may include a first position guide portion 512 and a first seating portion 514. The first position guide portion 512 and the first seating portion 514 may be respectively the same as the first position guide portion 312 and the first seating portion 314. The second guide portion 520 may include a second position guide portion 522 and a second seating portion 524. The second position guide portion 522 and the second seating portion 524 may be respectively the same as the second position guide portion 522 and the second seating portion 524.

Hereinafter, a display apparatus according to yet another exemplary embodiment will be described.

In descriptions of the following exemplary embodiment, the descriptions of redundant configurations will be omitted.

Figure 19:
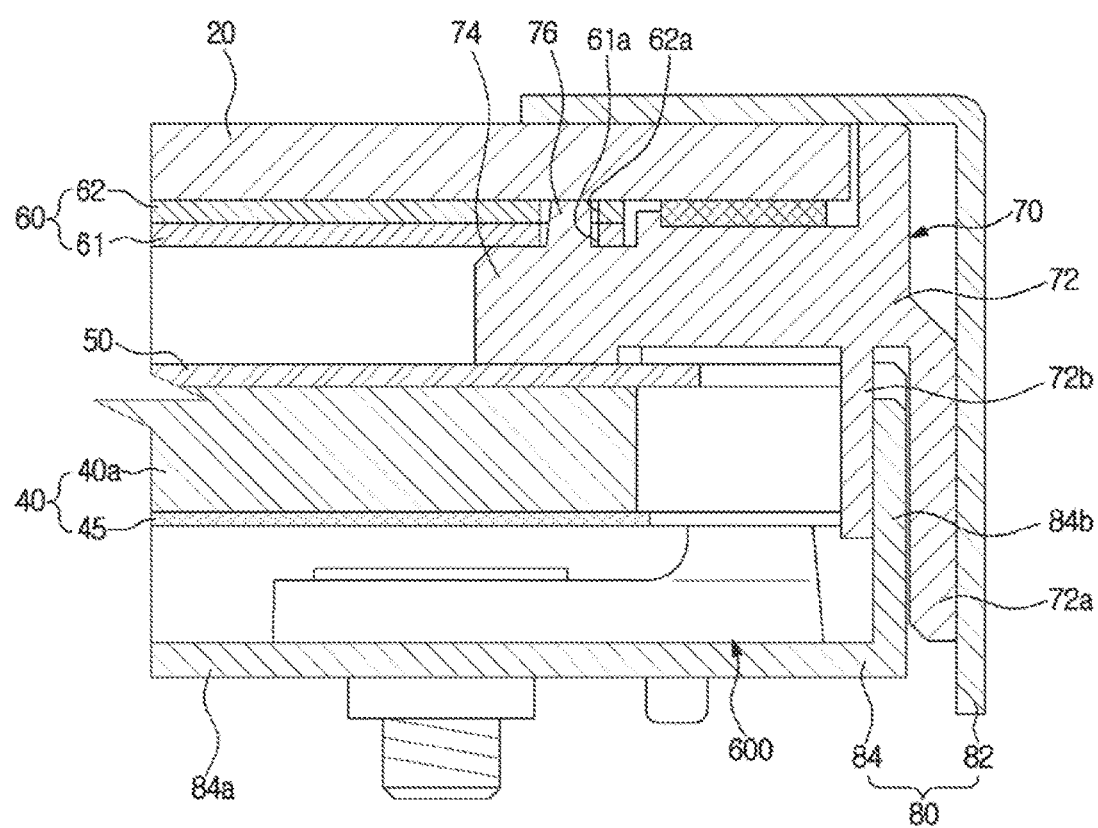
FIG. 19 is a cross-sectional view illustrating a guide member and a configuration adjacent thereto of a display apparatus according to yet another exemplary embodiment.
Figure 20:
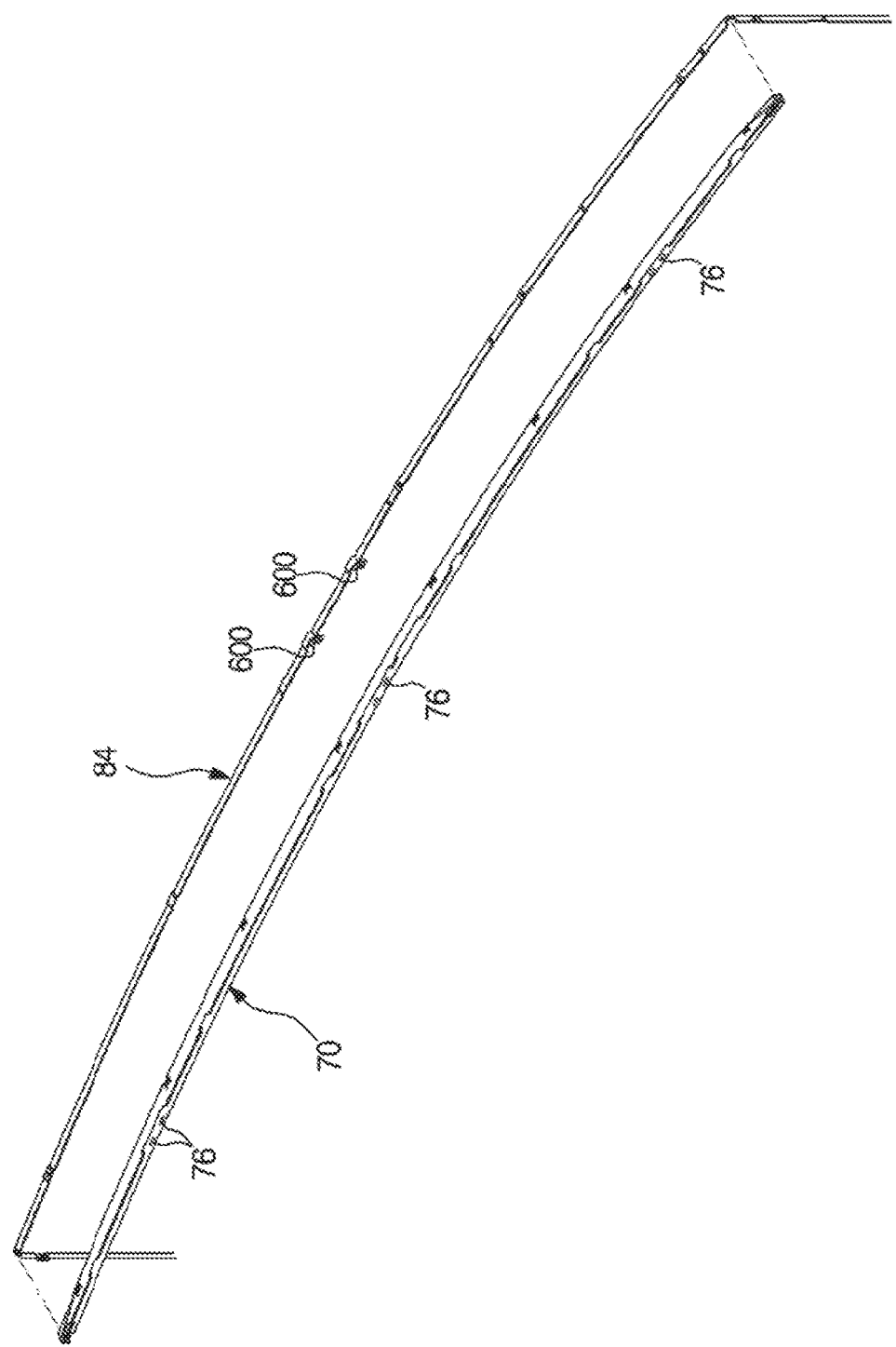
FIG. 20 is a perspective view illustrating a partial configuration of the display apparatus according to yet another exemplary embodiment.

FIG. 19 is a cross-sectional view illustrating a guide member and a configuration adjacent thereto of a display apparatus according to yet another exemplary embodiment, and FIG. 20 is a perspective view illustrating a partial configuration of the display apparatus according to yet another exemplary embodiment.

A display apparatus 1 may include a middle mold 70.

The middle mold 70 is provided to support a light guide plate 40. The middle mold 70 may be coupled to a bottom chassis 84, and to support the light guide plate 40 and a QD sheet 50.

The middle mold 70 includes a middle body 72, and a pressing rib 74.

The middle body 72 is coupled to the bottom chassis 84. The middle body 72 is formed to be coupled along a circumferential surface of the bottom chassis 84.

Specifically, the middle body 72 includes a first body coupling portion 72a which is coupled to an inside of a side surface portion 84b of the bottom chassis 84, and a second body coupling portion 72b which is coupled to an outside of the side surface portion 84b of the bottom chassis 84. Using such a configuration, the middle mold 70 is coupled to the bottom chassis 84 so that the side surface portion 84b of the bottom chassis 84 is positioned between the first body coupling portion 72a and the second body coupling portion 72b.

The pressing rib 74 is formed to extend from the middle body 72, and is provided to have an end which is positioned at an upper portion of the light guide plate 40 and the QD sheet 50. When the middle mold 70 is coupled to the bottom chassis 84, the pressing rib 74 is provided to press the QD sheet 50 and the light guide plate 40 together toward the bottom chassis 84. Accordingly, the QD sheet 50 and the light guide plate 40 may be adhered to each other. In addition, the light guide plate 40 and the QD sheet 50 seated on a guide member 600 are fixed to each other.

The pressing rib 74 may be formed along at least a part of a circumference of the QD sheet 50 and the light guide plate 40. Since the middle mold 70 may be formed along a circumference of the bottom chassis 84, the pressing rib 74 may be formed along an entire circumference of the QD sheet 50 and the light guide plate 40.

In addition, since the pressing rib 74 is formed to extend from the middle body 72 and to have an end which reaches a front surface of the QD sheet 50, the pressing rib 74 may not expose the guide member 600 to the outside. That is, the guide member 600 may be covered by the pressing rib 74, and the guide member 600 may not be influenced from the outside. The middle mold 70 may include a sheet guide portion 76. The sheet guide portion 76 is provided in front of the middle body 72, and is provided to seat an optical sheet 60. The sheet guide portion 76 is formed to extend from the middle body 72 in a forward direction, and is provided to seat the optical sheet 60. A shape of the sheet guide portion 76 is not limited, but may be formed in a shape to protrude or extend from the middle body 72.

Sheet guide grooves 61a and 62a may be formed at the optical sheet 60 to correspond to the sheet guide portion 76. As the sheet guide grooves 61a and 62a of the optical sheet 60 are seated on the sheet guide portion 76 of the middle mold 70, the sheet guide grooves 61a and 62a are provided so that a position of the optical sheet 60 is guided by the middle mold 70. Shapes of the sheet guide grooves 61a and 62a are not limited as long as the sheet guide grooves 61a and 62a are guided or supported by the sheet guide portion 76.

At least one sheet guide portion 76 may be provided at the middle mold 70. The number of the sheet guide portions 76 is not limited, and a plurality of sheet guide portions 76 may be spaced apart from each other at the middle body 72 to stably support the optical sheet 60.

The sheet guide portion 76 of the middle mold 70 may be spaced apart from the guide member 600. That is, the sheet guide portions 76 which are separately provided at the middle body 72 as illustrated in FIG. 20 are separately positioned from a plurality of guide members 600. That is, an arrangement of at least one sheet guide portion 76 may be mismatched with at least one guide member 600.

Hereinafter, a display apparatus according to yet another exemplary embodiment will be described.

In descriptions of the following exemplary embodiment, the descriptions of redundant configurations will be omitted.

Figure 21:
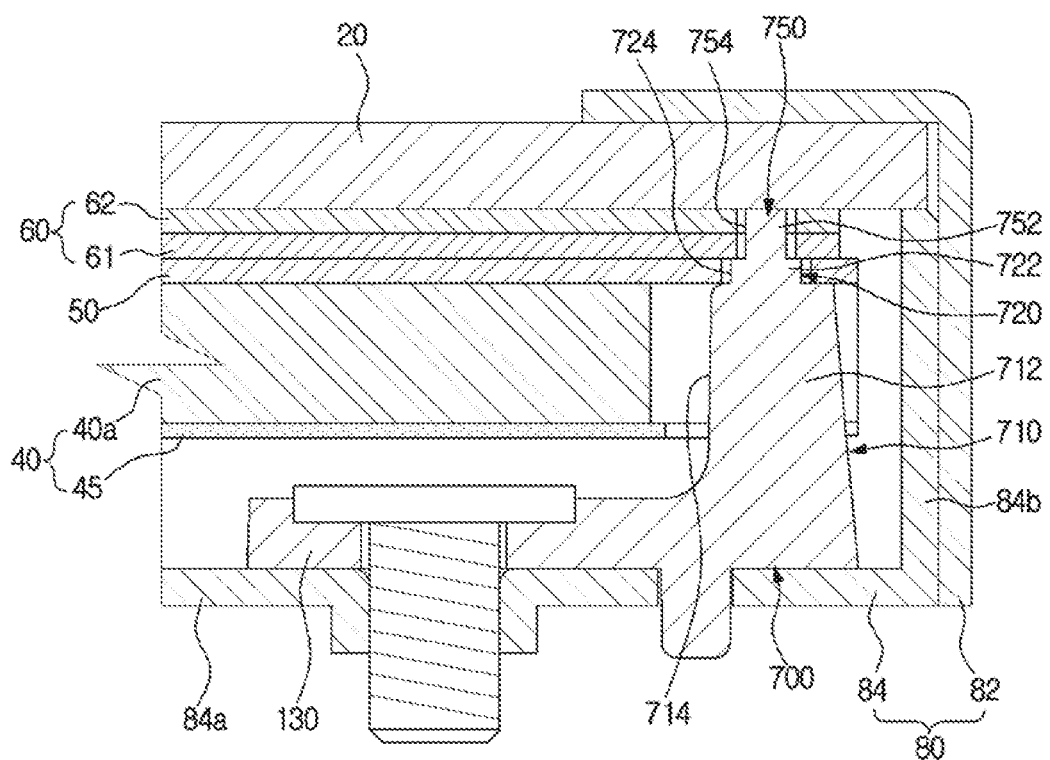
FIG. 21 is a cross-sectional view illustrating a guide member and a configuration adjacent thereto of a display apparatus according to yet another exemplary embodiment.

FIG. 21 is a cross-sectional view illustrating a guide member and a configuration adjacent thereto of a display apparatus according to yet another exemplary embodiment.

A display apparatus 1 may include a guide member 700.

The guide member 700 may be fixed to an inside of a chassis 80. Specifically, the guide member 700 may be fixed to a bottom chassis 84. At least one guide member 700 is provided, and is provided to fix or seat components inside the chassis 80.

The guide member 700 may include a guide portion configured to fix or seat components of the inside of the chassis 80. That is, the guide portion is provided so that a light guide plate 40, a QD sheet 50, and an optical sheet 60 are guided to or seated on the chassis 80.

The guide portion may include a first guide portion 710, a second guide portion 720, and a third guide portion 750.

The first guide portion 710 may be provided to guide the light guide plate 40, the second guide portion 720 may be provided to guide the QD sheet 50, and the third guide portion 750 may be provided to guide the optical sheet 60.

The first guide portion 710 may include a first position guide portion 712 and a first seating portion 714.

The second guide portion 720 may be formed to extend from the first guide portion 710. The second guide portion 720 may be provided to support the QD sheet 50. The second guide portion 720 may include a second position guide portion 722 and a second seating portion 724.

The first guide portion 710 and the second guide portion 720 are respectively the same as the first guide portion 110 and the second guide portion 120.

The third guide portion 750 may be formed to extend from the second guide portion 720. The third guide portion 750 may be provided to support the optical sheet 60. The third guide portion 750 may include a third position guide portion 752 and a third seating portion 754.

The third position guide portion 752 is provided to maintain a supporting position of the optical sheet 60. A sheet guide groove is provided at the optical sheet 60, and a position of the optical sheet 60 is guided so that the third position guide portion 752 is inserted into the sheet guide groove of the optical sheet 60.

The third seating portion 754 is seats the optical sheet 60 guided by the third position guide portion 752. The third seating portion 754 may be formed on a surface of the third position guide portion 752, or may also be separately formed from the third position guide portion 752.

Since the third position guide portion 752 and the third seating portion 754 respectively correspond to the second position guide portion and the second seating portion, descriptions of the third position guide portion 752 and the third seating portion 754 may be respectively the same as the descriptions of the second position guide portion and the second seating portion.

The third guide portion 750 may be formed to be stepped with respect to the second guide portion 720. Specifically, a cross-sectional area perpendicular to a lengthwise direction of the third position guide portion 752 may be less than a cross-sectional area perpendicular to a lengthwise direction of the second position guide portion 722. In addition, when the QD sheet 50 is installed at the second guide portion 720, the second guide portion 720 may be provided not to protrude higher than the QD sheet 50. That is, a height of the second guide portion 720 may be provided to correspond to a thickness of the QD sheet 50.

As described above, since the second guide portion 720 and the third guide portion 750 may be formed to be stepped from each other, and the second guide portion 720 is formed not to protrude higher than the QD sheet 50, the QD sheet 50 installed at the second guide portion 720 and the optical sheet 60 installed at the third guide portion 750 are provided not to interfere with each other, and are installed at the guide member 700. Accordingly, when the QD sheet 50 is installed at the second guide portion 720 and the optical sheet 60 is installed at the third guide portion 750, no space is left between the QD sheet 50 and the optical sheet 60, and the QD sheet 50 and the optical sheet 60 are adhered to each other.

Even though the third guide portion 750 is formed to be stepped with respect to the second guide portion 720, it is not limited thereto, and it is satisfied as long as the third guide portion 750 is formed to extend from the second guide portion 720 and guides or seats the optical sheet 60.

The light guide plate 40, the QD sheet 50, and the optical sheet 60 are guided by the guide member 700 from a front side of the bottom chassis 84, and a display panel 20 may be provided in front of the optical sheet 60. In addition, a top chassis 82 corresponding to the bottom chassis 84 is provided in front of the display panel 20. That is, the light guide plate 40, the QD sheet 50, the optical sheet 60, and the display panel 20 may be interposed between the bottom chassis 84 and the top chassis 82. In this case, the middle mold 70 of one exemplary embodiment is omitted, and the light guide plate 40, the QD sheet 50, the optical sheet 60, and the display panel 20 are guided or seated to an inside of the chassis 80. However, it is not limited thereto, and a middle mold 70 may be included.

Hereinafter, a display apparatus according to yet another exemplary embodiment will be described.

In descriptions of the following exemplary embodiment, the descriptions of redundant configurations will be omitted.

Figure 22:
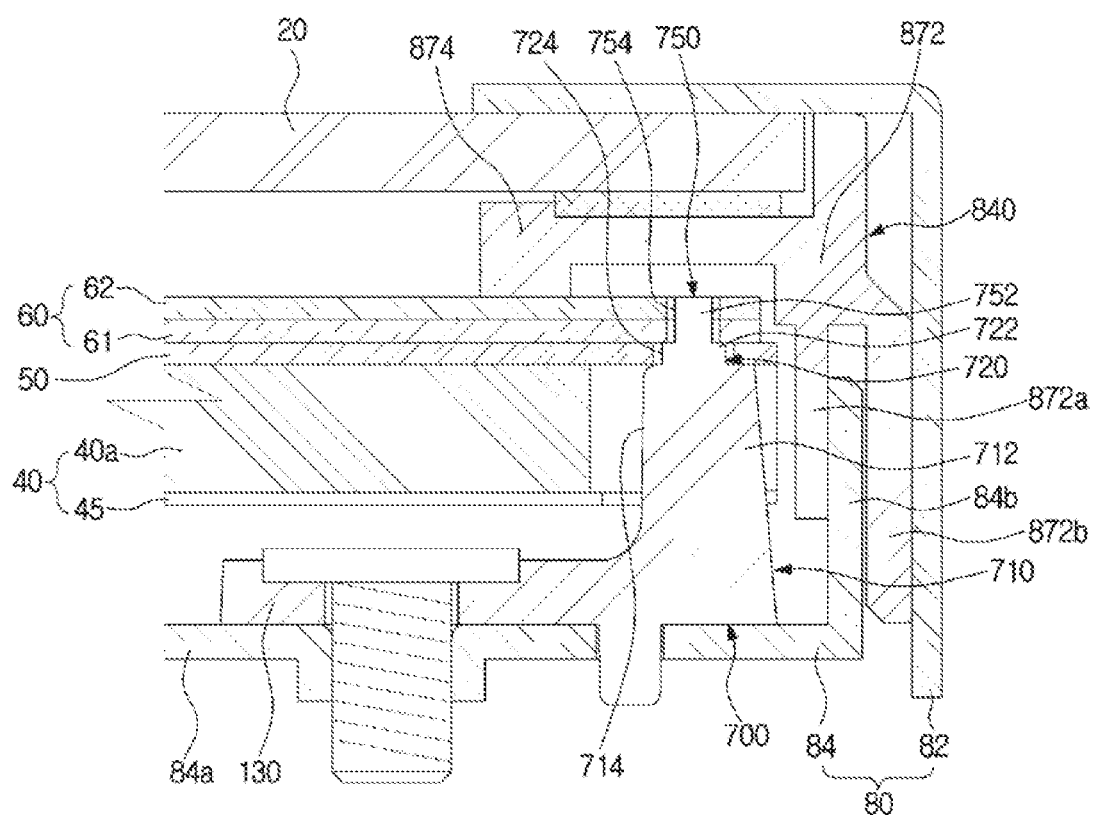
FIG. 22 is a cross-sectional view illustrating a guide member and a configuration adjacent thereto of a display apparatus according to yet another exemplary embodiment.

FIG. 22 is a cross-sectional view illustrating a guide member and a configuration adjacent thereto of a display apparatus according to yet another exemplary embodiment.

A display apparatus 1 may include a middle mold 870.

The middle mold 870 may be provided to support a light guide plate 40, a QD sheet 50, and an optical sheet 60. The middle mold 870 may be coupled to a bottom chassis 84, and to support the light guide plate 40, the QD sheet 50, and the optical sheet 60.

The middle mold 870 includes a middle body 872 and a pressing rib 874.

The middle body 872 is coupled to the bottom chassis 84. The middle body 872 is formed to be coupled along a circumferential surface of the bottom chassis 84.

Specifically, the middle body 872 includes a first body coupling portion 872a coupled to an inside of a side surface portion 84b of the bottom chassis 84, and a second body coupling portion 872b coupled to an outside of the side surface portion 84b of the bottom chassis 84. Using such a configuration, the middle mold 870 is coupled to the bottom chassis 84 so that the side surface portion 84b of the bottom chassis 84 is interposed between the first body coupling portion 872a and the second body coupling portion 872b.

The pressing rib 874 is provided to extend from the middle body 872, and to have an end which is positioned at an upper portion of the light guide plate 40, the QD sheet 50, and the optical sheet 60. When the middle mold 870 is coupled to the bottom chassis 84, the pressing rib 874 is provided to press the light guide plate 40, the QD sheet 50, and the optical sheet 60 together toward the bottom chassis 84. Accordingly, the light guide plate 40, the QD sheet 50, and the optical sheet 60 may be adhered to each other. In addition, the light guide plate 40, the QD sheet 50, and the optical sheet 60 seated on a guide member 100 are fixed thereto.

Disposition order of the light guide plate 40, the QD sheet 50, and the optical sheet 60 is not limited, but in an exemplary embodiment, the light guide plate 40, the QD sheet 50, and the optical sheet 60 are adjacent to the bottom chassis 84 in the above-described order.

The pressing rib 874 may be formed along at least a part of a circumference of the QD sheet 50 and the light guide plate 40. Since the middle mold 870 may be formed along a circumference of the bottom chassis 84, the pressing rib 874 may be formed along an entire circumference of the QD sheet 50 and the light guide plate 40.

In addition, since the pressing rib 874 is formed to extend from the middle body 872 and to have an end which reaches a front surface of the optical sheet 60, the pressing rib 874 may not expose the guide member 100 to the outside. That is, the guide member 100 may be covered by the pressing rib 874, and the guide member 100 may not be influenced from the outside.

A display panel 20 may be provided in front of the middle mold 870, and a top chassis 82 may be provided in front of the display panel 20 to correspond to the bottom chassis 84.

The guide member 700 in FIG. 21 may be applied to the light guide plate 40, the QD sheet 50, and the optical sheet 60, and may guide them to an installation position.

Hereinafter, a display apparatus according to yet another exemplary embodiment will be described.

In descriptions of the following exemplary embodiment, the descriptions of redundant configurations will be omitted.

Figure 23:
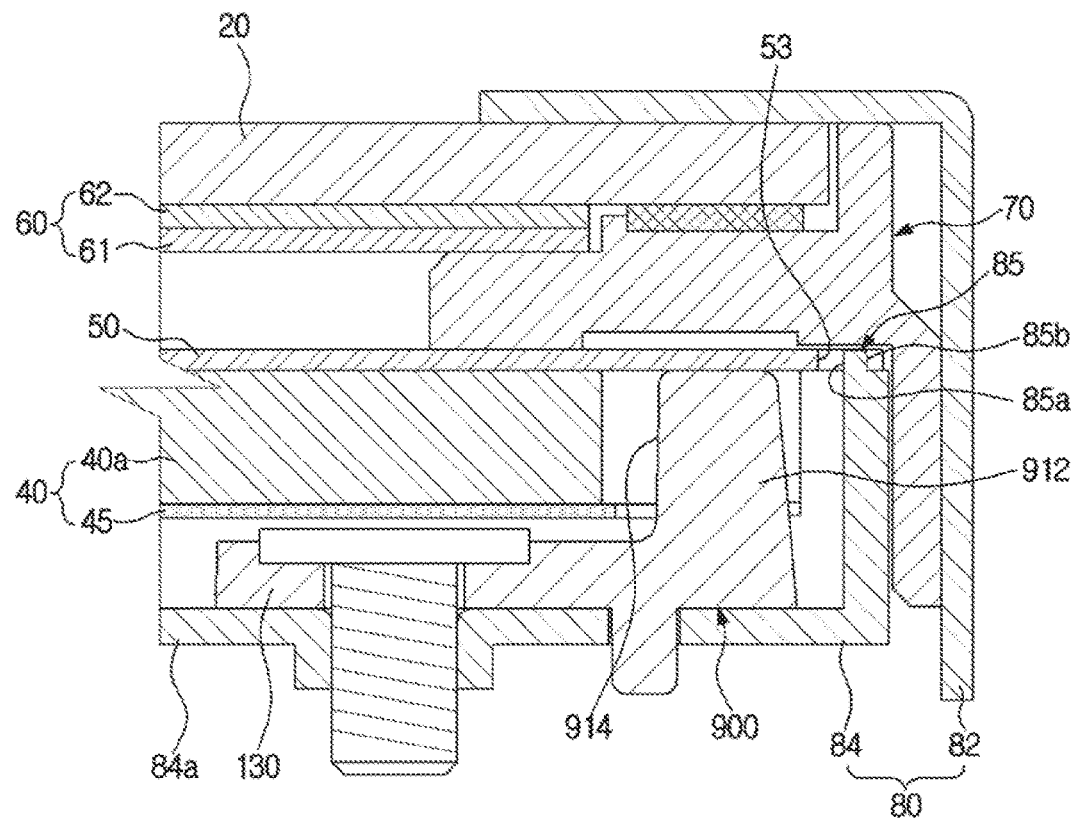
FIG. 23 is a cross-sectional view illustrating a guide member and a configuration adjacent thereto of a display apparatus according to yet another exemplary embodiment.
Figure 24:
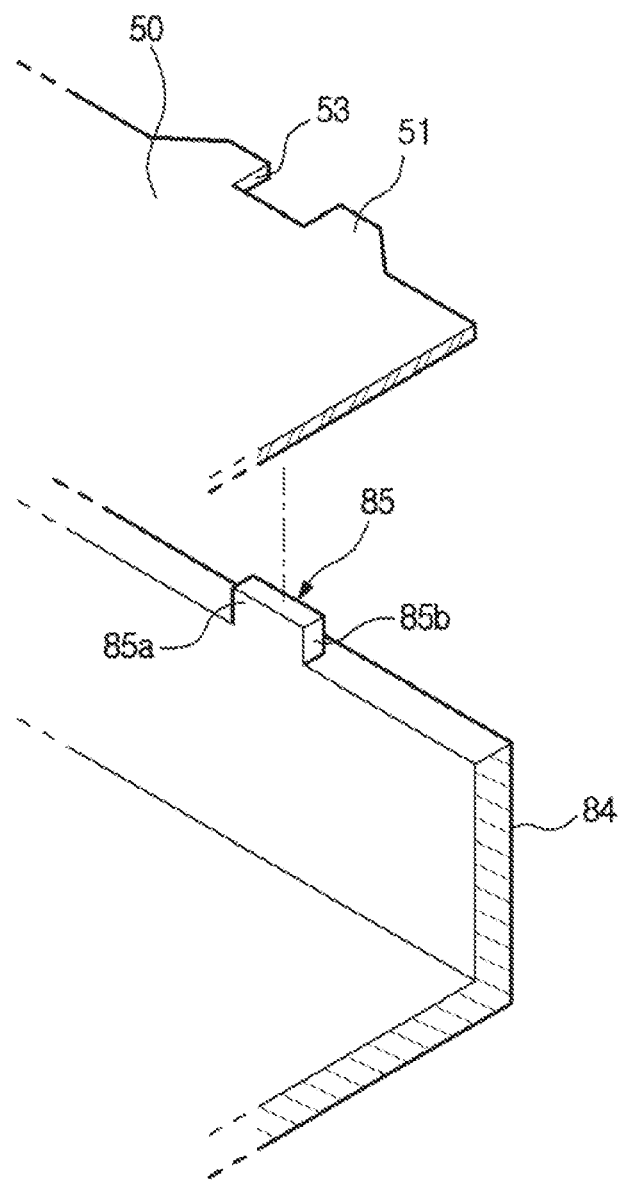
FIG. 24 is a view illustrating coupling of a partial configuration of the display apparatus according to yet another exemplary embodiment.

FIG. 23 is a cross-sectional view illustrating a guide member and a configuration adjacent thereto of a display apparatus according to yet another exemplary embodiment, and FIG. 24 is a view illustrating coupling of a partial configuration of the display apparatus according to yet another exemplary embodiment.

A top chassis 82 includes a bezel portion 82a which covers a front edge of a display panel 20, and a top side surface portion 82b which is bent from an end of the bezel portion 82a in a backward direction and covers a side surface of a middle mold 70.

A bottom chassis 84 includes a rear surface portion 84a which forms a rear surface of a display module 10, and a bottom side surface portion 84b which extends from a circumference of the rear surface portion in a forward direction and is coupled to an inside of the middle mold 70.

A display apparatus 1 may include a guide member 900.

The guide member 900 is provided to guide or seat a light guide plate 40. The guide member 900 may include a guide portion 910 provided to fix or seat components inside a chassis 80.

The guide portion 910 is provided to guide the light guide plate 40. The guide portion 910 is formed from the bottom chassis 84 in a lengthwise direction which is a widthwise direction of the bottom chassis 84 so that one side of the light guide plate 40 is seated. The widthwise direction may be defined as a direction perpendicular to the bottom chassis 84. In addition, since the top chassis 82 and the bottom chassis 84 are respectively coupled as front and rear chassis of the display module 10, the widthwise direction may be defined as a direction from the top chassis 82 to the bottom chassis 84.

The guide portion 910 may include a position guide portion 912 and a seating portion 914. The position guide portion 912 and the seating portion 914 may be respectively the same as the first position guide portion 112 and the first seating portion 114.

The bottom chassis 84 may include a side surface guide portion 85 which guides a QD sheet 50. The side surface guide portion 85 is formed to extend from the bottom side surface portion 84b, and to guide the QD sheet 50.

The side surface guide portion 85 may include a sheet position guide portion 85a and a sheet seating portion 85b.

The sheet position guide portion 85a is provided to guide a supporting position of the QD sheet 50. When the QD sheet 50 is installed at the bottom chassis 84, the side surface guide portion 85 is provided to guide the QD sheet 50 to an installation position. The sheet position guide portion 85a may be formed to extend from the bottom side surface portion 84b, and to protrude more than the bottom side surface portion 84b adjacent thereto. That is, the sheet position guide portion 85a may be integrally formed with the bottom side surface portion 84b, and may be formed in a shape which protrudes from the bottom side surface portion 84b. However, the sheet position guide portion 85a is not limited thereto, and the sheet position guide portion 85a may be detachably provided from the bottom side surface portion 84b as a separate component from the bottom side surface portion 84b.

The QD sheet 50 may include a QD sheet body 51, and a QD sheet groove portion 53 which is formed at the QD sheet body 51 in a groove shape to be supported by the side surface guide portion 85 in the groove shape. The QD sheet body 51 may include a QD sheet seating portion 52 formed to protrude from the same surface of the QD sheet body 51. Since the QD sheet groove portion 53 is formed in the QD sheet seating portion 52, movement of light in the QD sheet body 51 may not be interfered by the side surface guide portion 85 provided at the QD sheet groove portion 53. The QD sheet groove portion 53 may be formed in the QD sheet seating portion 52, or may also be formed in the QD sheet body 51.

At least one side surface guide portion 85 may be provided along the bottom side surface portion 84b. In an exemplary embodiment, for example, a plurality of side surface guide portions 85 may be spaced apart from each other along the bottom side surface portion 84b.

The sheet seating portion 85b is provided to seat the QD sheet 50 guided by the sheet position guide portion 85a. The sheet seating portion 85b may be formed on a surface of the sheet position guide portion 85a, or may also be separately formed from the sheet position guide portion 85a. In an exemplary embodiment, the sheet seating portion 85b may be formed at a side portion of the sheet position guide portion 85a along the bottom side surface portion 84b.

The display apparatus 1 may include the middle mold 70.

The middle mold 70 is provided to support the light guide plate 40. The middle mold 70 may be coupled to the bottom chassis 84, and to support the light guide plate 40 and the QD sheet 50. The middle mold 70 includes a middle body 72, and a pressing rib 74. The middle body 72 is coupled to the bottom chassis 84. The middle body 72 is formed to be coupled along a circumferential surface of the bottom chassis 84.

The top chassis 82 may be provided in front of the middle mold 70.

As is apparent from the above description, a display unit according to the exemplary embodiments improves a structure and color reproducibility thereof.

As a structure which guides a light guide plate and a QD sheet is improved, an internal configuration can be simplified. In addition, as adhesive force between the light guide plate and the QD sheet is improved and maintained, color reproducibility of displayed images can be improved.

As a structure which guides a QD sheet is improved, a bezel portion can be minimized.

That is, a display module and a display apparatus using the same according to the exemplary embodiments can improve color reproducibility, simultaneously minimize a bezel portion of the display apparatus, and slim down the thickness thereof, using a QD sheet.

Although a few exemplary embodiments have been shown and described above, the exemplary embodiments are not limited to the aforementioned specific exemplary embodiments. Those skilled in the art may variously modify the exemplary embodiments without departing from the gist and scope of the invention as described by the appended claims.

What is claimed is:

1. A display module comprising:
   a display panel;
   a chassis which supports the display panel;
   a light source which is provided on at least one side surface inside the chassis and is configured to emit light;
   a light guide plate which has an emitting surface and is configured to guide the light emitted by the light source through the emitting surface;
   a quantum dot (QD) sheet which is provided between the emitting surface of the light guide plate and the display panel; and
   at least one guide member which is fixed to an interior surface of the chassis, and supports a side surface of the light guide plate and a side surface of the QD sheet,
   wherein the at least one guide member comprises a member fixing portion which fixes the at least one guide member to the chassis, the member fixing portion being interposed between the chassis and the light guide plate.

2. The display module of claim 1, wherein the at least one guide member supports the light guide plate and the QD sheet together.

3. The display module of claim 1, wherein the at least one guide member is detachably fixed to the chassis.

4. The display module of claim 1, wherein the at least one guide member comprises:
   a first guide portion which supports the side surface of the light guide plate; and
   a second guide portion which extends from the first guide portion and supports the side surface of the QD sheet.

5. The display module of claim 4, wherein the second guide portion protrudes from the first guide portion.

6. The display module of claim 4, wherein the first guide portion comprises:
   a first position guide portion which guides the light guide plate to an installation position thereof; and
   a first seating portion which seats the light guide plate guided by the first position guide portion.

7. The display module of claim 6, wherein the second guide portion comprises:
   a second position guide portion which guides the QD sheet to an installation position thereof; and
   a second seating portion which seats the QD sheet guided by the second position guide portion.

8. The display module of claim 7, wherein the first seating portion is provided on a surface of the first position guide portion and the second seating portion is provided on a surface of the second position guide portion.

9. The display module of claim 7, wherein the second position guide portion is stepped with respect to the first position guide portion.

10. The display module of claim 4, wherein the light guide plate is supported by the first guide portion, and
    wherein the first guide portion extends to a front surface of the light guide plate.

11. The display module of claim 4, wherein the chassis comprises a bottom chassis provided at a rear of the light guide plate, the rear of the light guide plate being opposite to the emitting surface of the light guide plate, and
    wherein the member fixing portion extends from the first guide portion, and is interposed between the bottom chassis and the rear of the light guide plate.

12. The display module of claim 11, wherein the at least one guide member further comprises a position determination portion which extends from the first guide portion into the bottom chassis, and is configured to fix a position of the at least one guide member with respect to the bottom chassis.

13. The display module of claim 5, wherein the light guide plate comprises:
   a light guide plate body;
   a light guide plate seating portion which protrudes from the light guide plate body; and
   a light guide plate groove portion which is formed in the light guide plate seating portion and receives the first guide portion, and
   wherein the QD sheet comprises:
      a QD sheet body;
      a QD sheet seating portion which protrudes from the QD sheet body; and
      a QD sheet groove portion formed in the QD sheet seating portion and receives the second guide portion.

14. The display module of claim 1, wherein the light source comprises:
   a plurality of blue light emitting diodes (LEDs) configured to emit blue light; and
   a circuit board configured to supply power to the plurality of blue LEDs, and
   wherein the QD sheet comprises a yellow QD sheet configured to convert the blue light emitted by the plurality of blue LEDs into white light.

15. The display module of claim 1, wherein the at least one guide member comprises a first guide member which supports an upper portion of the light guide plate and the QD sheet at a first position, and a second guide member which supports the upper portion of the light guide plate and the QD sheet at a second position.

16. The display module of claim 15, wherein the at least one guide member further comprises a third guide member which supports a lower portion of the light guide plate and the QD sheet.

17. The display module of claim 1, wherein the chassis comprises a bottom chassis provided at a rear surface of the light guide plate, and the display module further comprises a middle mold having a pressing rib which is coupled to the bottom chassis and presses the light guide plate and the QD sheet together.

18. The display module of claim 1, wherein the at least one guide member is black so as to reduce a reflection of light emitted by the light source.

19. The display module of claim 1, wherein the QD sheet is in contact with the emitting surface of the light guide plate.

20. The display module of claim 1, further comprising a middle mold comprising a pressing rib which is coupled to the chassis and presses the light guide plate and the QD sheet together.

21. The display module of claim 20, further comprising an optical sheet which is interposed between the QD sheet and the display panel,
   wherein the middle mold further comprises a middle body coupled to the chassis, and
   wherein the pressing rib extends from the middle body and presses the optical sheet and the light guide plate against the QD sheet.

22. A display apparatus comprising:
   a housing; and
   a display module supported by the housing and configured to display an image,
   wherein the display module comprises:
      a display panel;
      a backlight unit which is configured to emit light to the display panel, the backlight unit comprising a light source including a plurality of blue LEDs which emit blue light;
      a light guide plate which has an emitting surface and is configured to guide the light emitted by the light source through the emitting surface toward the display panel;
      a quantum dot (QD) sheet is provided between the emitting surface of the light guide plate and the display panel, and is configured to convert the blue light emitted by the plurality of blue LEDs into white light;
      a chassis which accommodates the light source, the light guide plate, and the QD sheet; and
      a guide member which supports a light guide plate groove portion included in the light guide plate and a QD sheet groove portion included in the QD sheet, and is fixed to the chassis.

23. The display apparatus of claim 22, further comprising a middle mold comprising a pressing rib which is coupled to the chassis and presses the light guide plate and the QD sheet together.

24. The display apparatus of claim 23, wherein the display module further comprises an optical sheet provided between the QD sheet and the display panel,
   wherein the middle mold further comprises a middle body coupled to the chassis, and
   wherein the pressing rib extends from the middle body and presses the QD sheet, the optical sheet and the light guide plate.

25. The display apparatus of claim 24, wherein the pressing rib extends along an entire circumference of the QD sheet and the optical sheet.

26. A display module comprising:
   a display panel configured to display an image;
   a chassis which houses the display panel, the chassis comprising a top chassis and a bottom chassis provided on opposing sides of the display panel;
   a light source which is provided between the bottom chassis and the display panel and is configured to emit light to the display panel;
   a light guide plate provided between the light source and the display panel and configured to guide the light emitted by the light source through an emitting surface of the light guide plate and to the display panel;
   a quantum dot (QD) sheet provided between the light emitting surface of the light guide plate and the display panel; and
   a guide member which aligns the light guide plate and the QD sheet, and is fixed to an interior surface of the bottom chassis,
   wherein the guide member comprises a first guide portion and a second guide portion extending form the first guide portion, the first guide portion having a first cross-sectional area and the second guide portion having a second cross-sectional area that is different than the first cross-sectional area, and
   wherein the QD sheet comprises a QD sheet body, a QD sheet seating portion, and a QD sheet groove portion formed in the QD sheet seating portion.

27. A display module of claim 26, wherein the first guide portion aligns the light guide plate and the second guide portion aligns the QD sheet.

28. The display module of claim 27, wherein the light guide plate comprises a light guide plate body, a light guide plate seating portion, and a light guide plate groove portion formed in the light guide plate seating portion, and
   wherein the light guide plate seating portion extends from a surface of the light guide plate body.

29. The display module of claim 28, wherein a cross-section area of the light guide plate groove portion corresponds to the first cross-sectional area.

30. The display module of claim 29,
   wherein the QD sheet seating portion extends from a surface of the QD sheet body.

31. The display module of claim 30, wherein a cross-section area of the QD sheet groove portion corresponds to the second cross-sectional area.

* * * * *